US012809469B2

(12) United States Patent
Jung et al.

(10) Patent No.: US 12,809,469 B2
(45) Date of Patent: Nov. 24, 2026

(54) ELECTRONIC DEVICE HAVING TOUCH PAD REGION AND KEYBOARD

(71) Applicant: LG ELECTRONICS INC., Seoul (KR)

(72) Inventors: Heechul Jung, Seoul (KR); Junhyung Lee, Seoul (KR); Younseob Kim, Seoul (KR); Seunggeun Lim, Seoul (KR); Dongkyun Kang, Seoul (KR); Minju Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 18/859,852

(22) PCT Filed: Jan. 16, 2024

(86) PCT No.: PCT/KR2024/000768
§ 371 (c)(1),
(2) Date: Oct. 24, 2024

(87) PCT Pub. No.: WO2024/158168
PCT Pub. Date: Aug. 2, 2024

(65) Prior Publication Data
US 2025/0291418 A1 Sep. 18, 2025

(30) Foreign Application Priority Data
Jan. 26, 2023 (KR) ........................ 10-2023-0010364

(51) Int. Cl.
*G06F 3/01* (2006.01)
*G06F 1/16* (2006.01)
(Continued)

(52) U.S. Cl.
CPC ............ *G06F 3/016* (2013.01); *G06F 1/1643* (2013.01); *G06F 3/02* (2013.01); *G06F 3/044* (2013.01)

(58) Field of Classification Search
CPC ........................................................ G06F 3/016
See application file for complete search history.

(56) References Cited

U.S. PATENT DOCUMENTS 11,537,170 B2 12/2022 Hori et al.
2007/0273671 A1* 11/2007 Zadesky ................ G06F 3/041 345/173

(Continued)

FOREIGN PATENT DOCUMENTS

KR 10-2019-0130140 A 11/2019
WO WO 2016/081072 A2 5/2016

*Primary Examiner* — Jerry Wu
(74) *Attorney, Agent, or Firm* — Birch, Stewart, Kolasch & Birch, LLP

(57) ABSTRACT

Discussed is an electronic device, the electronic device including a display configured to display an image; and a base part operably coupled to the display, and having a touch pad region for detecting a touch input, a keyboard region including a keyboard, and a peripheral region surrounding the touch pad region and the keyboard region, wherein the base part includes: a first region of a metal case and including the peripheral region; a second region of the metal case and corresponding to the touch pad region; and a coating layer disposed on an upper area of the first region and an upper area of the second region to cover a boundary between the first region and the second region, and wherein the coating layer is on both the touch pad region and the peripheral region.

18 Claims, 12 Drawing Sheets

(51) Int. Cl.
*G06F 3/02* (2006.01)
*G06F 3/044* (2006.01)

(56) References Cited

U.S. PATENT DOCUMENTS

| | | | | |
|---|---|---|---|---|
| 2018/0245950 | A1 | 8/2018 | Uppili | |
| 2019/0371543 | A1 | 12/2019 | Chiang et al. | |
| 2022/0050537 | A1* | 2/2022 | Wu | G06F 1/169 |

* cited by examiner (a)

(b)

(a)

(b)

(a)

(b)

ELECTRONIC DEVICE HAVING TOUCH PAD REGION AND KEYBOARD

CROSS REFERENCE TO RELATED APPLICATIONS

This application is the National Stage filing under 35 U.S.C. 371 of International Application No. PCT/KR2024/000768, filed on Jan. 16, 2024, which claims the priority benefit under 35 U.S.C. § 119(a) to Korean Patent Application No. 10-2023-0010364, filed in the Republic of Korea on Jan. 26, 2023, the entire contents which are hereby expressly incorporated by reference into the present application.

TECHNICAL FIELD

The present disclosure relates to an electronic device including a touch pad region and a keyboard. More specifically, the present disclosure relates to an electronic device including a display and a keyboard and having a touch pad region.

BACKGROUND ART

Electronic devices may be divided into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs.

Currently, touch interfaces are provided in many electronic devices. For example, touch screens are disposed as touch interfaces in not only portable electronic devices such as mobile phones, smart phones, tablet computers, laptop computers, personal digital assistants (PDAs), portable multimedia players (PMPs), digital cameras, portable game consoles, MP3 players, etc., but also electronic devices implemented as stationary terminals such as automated teller machines (ATMs), information retrieval machines, unmanned ticket machines, etc.

In conjunction with these touch interfaces, a haptic technology, which provides a sense of touch to a user as a way to enhance user experience, is attracting attention. Upon using such a haptic technology, various types of tactile sensations are provided to a user when the user interacts with digital objects, ultimately providing feedback that combines vision and tactile senses. Electronic devices using the haptic technology can provide users with more realistic touch interfaces than existing electronic devices.

Meanwhile, such touch interfaces may be provided in electronic devices implemented as mobile terminals. Among electronic devices implemented as mobile terminals, a laptop computer may be provided with a touch pad region in a separate area from a display. In an electronic device having a keyboard region, a touch pad region may be formed integrally with a peripheral region. The keyboard region of the electronic device corresponds to a keyboard deck, which is a top case. A rectangular touch pad region is formed around the keyboard region such that a cursor moves on a screen of the electronic device.

The touch pad region requires electrostatic performance and a physical click action, so separate components may be assembled and exposed to outside. This deviates from the simplicity of the design look. Therefore, a haptic module that provides haptic feedback in response to a touch input on the touch pad region needs to be applied. Additionally, a seamless design can be implemented by attaching glass to a large area of the touch pad region and the peripheral region.

Meanwhile, the glass disposed in the large area of the touch pad region and peripheral region configures a lower region of the electronic device. Accordingly, a boundary between an upper keyboard region of the keyboard region and a component is exposed, and thereby the simplicity of the design cannot be perfectly implemented.

DISCLOSURE OF INVENTION

Technical Problem

The present disclosure is to solve the above-mentioned problems and other drawbacks, and an aspect of the present disclosure is to provide an electronic device including a keyboard region in which a touch pad region and a peripheral region are integrally formed without a boundary therebetween.

Another aspect of the present disclosure is to provide a completely seamless design through a painting process so that there is no boundary between a touch pad region and a peripheral region.

Still another aspect of the present disclosure is to provide feedback on whether a user input has been normally applied through a haptic element disposed below a touch pad region.

Technical Solution

To achieve those aspects and other advantages of the present disclosure, there is provided an electronic device having a keyboard that includes: a display configured to display screen information; a base part operably coupled to the display, having a keyboard region, and configured to detect a touch input, the base part having a touch pad region for detecting a touch input and a peripheral region surrounding the touch pad region and the keyboard area. The base part includes: a first region formed as a metal case made of a metal formed on the peripheral region; a second region where at least a portion of the metal case is removed to correspond to the touch pad region; and a coating layer disposed on an upper area of the first region and an upper area of the second region to hide a boundary line between the first region and the second region. The coating layer may be formed on both the touch pad region and the peripheral region.

According to an embodiment, the touch pad region corresponding to the second region may be formed as dielectric mold part that is formed of a non-metal material at the same position as a top of the metal case. The coating layer may be disposed on an upper area of the dielectric mold part and an upper area of the metal case to hide a boundary between the metal case and the dielectric mold part.

According to an embodiment, the electronic device may further include a haptic module that is disposed on a lower area of the dielectric mold part, detects a touch input applied to a touched region of the touch pad region, and controls the touched region to vibrate.

According to an embodiment, the dielectric mold part may include a first portion coupled to the metal case and a second portion stacked on a substrate of the haptic module. Tops of the first portion and the second portion may be disposed at the same position on a Z axis. A second thickness of the second portion may be thicker than a first thickness of the first portion.

According to an embodiment, the metal case may be coupled to the first portion of the dielectric mold part. One end portion of the metal case may extend up to another end portion of the first portion of the dielectric mold part. A top of the metal case may be coupled to the coating layer, and a fourth thickness of the metal case is thicker than the first thickness of the first portion and the second thickness of the second portion of the dielectric mold part.

According to an embodiment, the metal case may include: a third portion that is coupled to the first portion of the dielectric mold part; and a fourth portion that is coupled to the first portion of the dielectric mold part through a side end portion and has the coating layer stacked on a top thereof. A bottom of the third portion and a bottom of the fourth portion may be disposed at the same position on the Z axis. A fourth thickness from the bottom to the top of the fourth portion may be thicker than a third thickness from the bottom to a top of the third part, so that the top of the third portion has a recess structure.

According to an embodiment, the metal case may further include a heat sealing tape that is disposed between the top of the third portion and the bottom of the first portion of the dielectric mold part to fix the metal case and the dielectric mold part by heat sealing.

According to an embodiment, the haptic module may include: a substrate that is disposed on a lower area of the dielectric mold part; haptic sensors that are disposed on a lower area of the substrate to be adjacent to the metal case to detect a touched region and pressure applied to the touched region; a haptic motor that is disposed on the lower area of the substrate to vibrate the touched region; and an integrated circuit that is disposed between the haptic sensor and the haptic motor to control an operation of the electronic device according to a type of user input on the touched region.

According to an embodiment, the haptic sensors may include a first haptic sensor to a fourth haptic sensor that are disposed on a top of one side, a bottom of the one side, a top of another side, and a bottom of the another side of the substrate on an XY plane. The integrated circuit may detect user inputs on a top of one side, a bottom of the one side, a top of another side, and a bottom of the another side of the touch pad region on the XY plane, by using the first haptic sensor to the fourth haptic sensor.

According to an embodiment, the second region may include a plurality of metal portions that are formed of a metal material and separated from each other, and pore structures that are formed between the metal portions. The pore structures may be formed by removing metal materials from the second region through chemical etching.

According to an embodiment, the pore structures may be formed in a cylindrical shape with a certain diameter or less in the second region. The pore structures may be formed up to a bottom of the metal case in the second region, so that a touch input on the touch pad region is transmitted to the haptic module.

According to an embodiment, the metal case may include a third portion formed on the first region and a fourth portion formed on the second region. A top of the third portion and a top of the fourth portion may be disposed at the same position on the Z axis. A fourth thickness of the fourth portion may be thicker than a third thickness of the third portion.

According to an embodiment, the second region may further include dielectric structures that are formed of a non-metal material having a certain dielectric constant and disposed inside the pore structures. A diameter of the dielectric structure may be the same as a diameter of the pore structures. A height of the dielectric structures may be the same as or higher than a height of the pore structures by a certain range.

According to an embodiment, the dielectric structures may be filled in the pore structures by a putty process. A top position of each of the dielectric structure may be higher than a top position of each of the pore structures. The top of the dielectric structure and the top of the pore structure may be tuned to be located at the same top position by a grinding process.

According to an embodiment, electronic device may further include a haptic module that is disposed on a lower area of the second region including the pore structures, detects a touch input applied to a touched region of the touch pad region, and controls the touched region to vibrate.

According to an embodiment, the haptic module may include: a substrate that is disposed on a lower area of the metal case of the second region where the pore structure are formed; haptic sensors that are disposed on a lower area of the substrate to be adjacent to the metal case of the first region to detect a touched region and pressure applied to the touched region; a haptic motor that is disposed on the lower area of the substrate to vibrate the touched region; and an integrated circuit that is disposed between the haptic sensor and the haptic motor to control an operation of the electronic device according to a type of user input on the touched region.

According to an embodiment, the haptic sensors may include a first haptic sensor to a fourth haptic sensor that are disposed on a top of one side, a bottom of the one side, a top of another side, and a bottom of the another side of the substrate on an XY plane. The integrated circuit may detect user inputs on a top of one side, a bottom of the one side, a top of another side, and a bottom of the anther side of the touch pad region on the XY plane, by using the first haptic sensor to the fourth haptic sensor.

A method for manufacturing a bottom case of an electronic device having a keyboard according to another aspect of the present disclosure is provided. The method may be performed by a manufacturing device that manufactures the bottom case of the electronic device. The method includes: a metal case manufacturing process of forming a base part, which is operably coupled to a display, has a keyboard region, and is configured to detect a touch input, by using a metal material, the base part having a touch pad region for detecting a touch input and a peripheral region surrounding the touch pad region and the keyboard region, a metal region removing process of removing at least a portion of the metal case to correspond to the touch pad region, a first region of the base part being formed as a metal case made of a metal material formed on the peripheral region, and the second region being formed by removing at least the portion of the metal case to correspond to the touch pad region; a dielectric mold part forming process of forming a dielectric mold part on the second region of the base part; and a coating layer forming process of forming a coating layer on an upper area of the first region and an upper area of the second region to hide a boundary between the metal case and the dielectric mold part. The coating layer may be formed on both the touch pad region and the peripheral region.

Advantageous Effects of Invention

Hereinafter, technical effects of an electronic device having a touch pad region and a keyboard according to the present disclosure will be described.

According to the present disclosure, there may be provided an electronic device that adopts outsert molding to a touch pad region and has a keyboard region formed integrally so that a boundary does not exist between the touch pad region and a peripheral region.

According to the present disclosure, a completely seamless design can be achieved through a painting process such that there are no boundaries between the touch pad region and the peripheral region and between upper and lower areas. Accordingly, the touch pad region and the peripheral region may be formed integrally with each other so that the touch pad region and the peripheral region are not distinguishable with the naked eye.

According to the present disclosure, light emitting elements may be additionally disposed on a substrate disposed inside the touch pad region, to feedback whether a user input has been normally applied, through light emission to a specific region, thereby forming a feedback region adjacent to a region where the user input has been applied.

According to the present disclosure, there may be provided a structural design and algorithm that can feedback whether a user input has been normally applied through light emission to a specific region disposed on top of the touch pad region.

According to the present disclosure, a haptic active area where haptic feedback related to a touch input is provided can be provided to the user through an intuitive user interface.

MODE FOR THE INVENTION

Figure 1A:
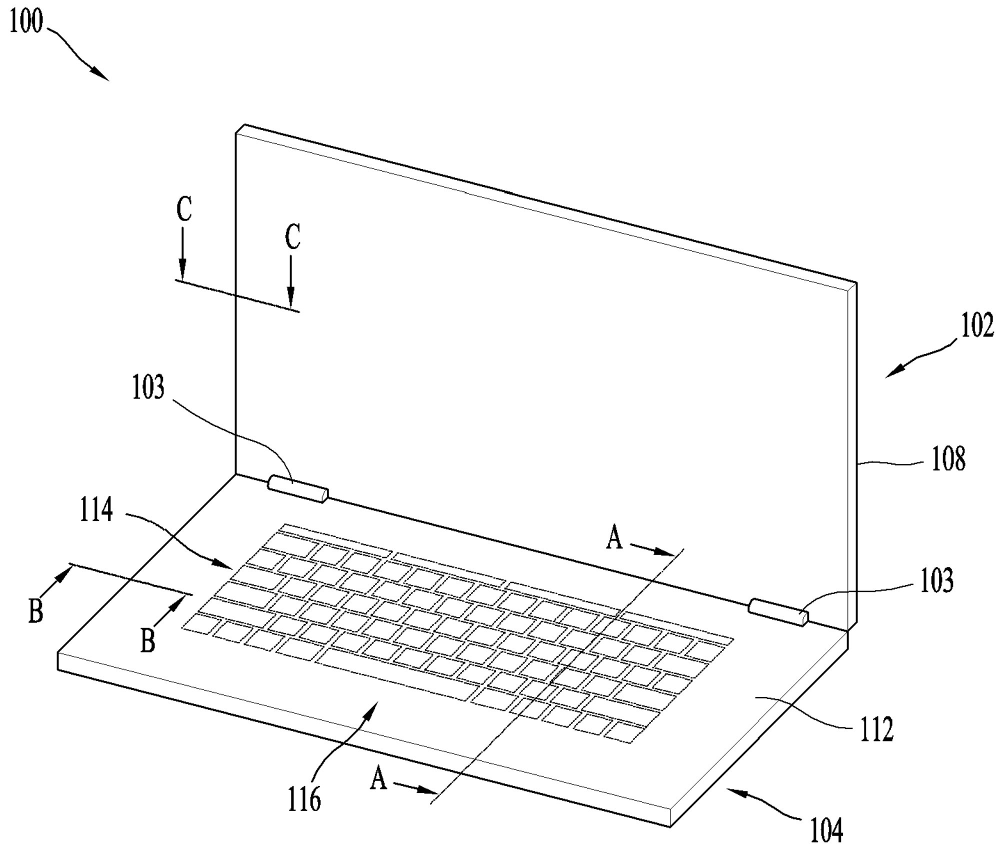
FIG. 1A is a view illustrating an electronic device that may include an integrated interface system with a haptic and touch pad region to which an optical module is applied, according to the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as “module” and “unit” may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being “connected with” another element, the element can be connected with the another element or intervening elements may also be present. In contrast, when an element is referred to as being “directly connected with” another element, there are no intervening elements present.

A singular representation may include a plural representation unless it represents a definitely different meaning from the context.

Terms “include” or “has” used herein should be understood that they are intended to indicate the existence of a feature, a number, a step, an element, a component or a combination thereof disclosed in the specification, and it may also be understood that the existence or additional possibility of one or more other features, numbers, steps, elements, components or combinations thereof are not excluded in advance.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Embodiments described herein generally relate to portable electronic devices (e.g., portable computers, notebook computers, laptop computers, etc.) having a top portion of an enclosure, which is formed of a dielectric material such as plastic, ceramic, glass, composites, or combinations thereof. A component formed of a dielectric material may define a portion of an interior volume of an enclosure for housing various components of a portable device, and may also define an input surface of an integrated interface system that allows for a wide variety of touch and keyboard inputs. In particular, an integrated interface system may act as a trackpad or a keyboard or may provide both trackpad and keyboard functions, and a dielectric component may define all or part of keyboard and trackpad zones.

In some embodiments described herein, an integrated interface system may be integrated with a plurality of sensors, including touch and force sensors, which can detect various types of inputs applied to various zones of an input surface. In some examples, the touch and/or force sensors are formed in a unitary structure configured to detect key inputs applied to a keyboard region (which may include mechanical and/or virtual keys) as well as touch inputs applied to a non-keyboard region. According to embodiments described herein, an integrated interface system may also be used to detect gestures and multi-touch inputs applied to keycaps of a mechanical keyboard, allowing the keycaps and keyboard zone to function as a trackpad.

The integrated interface system may also provide various types of output functionality, including visual outputs, haptic outputs, etc. For example, images of affordances (e.g., keys, keyboards, buttons, sliders, dials, etc.) may be displayed on a top case (e.g., by using a display device) to indicate where touch or force inputs can be applied. As another example, the top case of the integrated interface system may be configured to move or vibrate to provide tactile or haptic outputs in response to detection of touch or force inputs. Therefore, the integrated interface system can provide comprehensive input and output functions through an integrated input/output surface.

As mentioned above, a component defining the input surface of the integrated interface system may be formed of a continuous and/or seamless sheet of dielectric material such as glass, plastic, or ceramic (e.g., the component may be a single glass member). The sheet may have properties that enable the various input and output functions described herein. For example, the sheet may have strength and high resistance to scratching, and provide a surface finish that has a superior appearance and/or feel compared to other materials or components. Since the sheet is also dielectric and/or substantially non-conductive, touch and force inputs may be detected through the sheet and electromagnetic waves and/or fields (e.g., radio frequency signals, induced power, guided signals, and other wireless communications or electromagnetic energy transfer) may be allowed to pass through the sheet without substantial attenuation. The sheet may be continuous or seamless, which can help suppress the introduction of liquids or other foreign debris. The sheet is also light-transmissive, and thus may allow images or light to be seen therethrough. As used herein, light transmission may be used to refer to being transparent, translucent, or otherwise allowing light to propagate therethrough. In some examples, transparent materials or components may introduce partial diffusion, lensing effects, distortions, etc. (e.g., due to surface textures), while still allowing objects or images to be visible therethrough. Such deviations are understood to be within the scope of the meaning of transparency. Additionally, transparent materials may be coated, painted, or otherwise processed to create non-transparent (e.g., opaque) components; in such cases, even though the material may be part of an opaque component, the material may still be referred to as being transparent. On the other hand, translucent components may be formed by creating a textured or frosted surface on a transparent material (e.g., transparent glass). Translucent materials, such as translucent polymers, translucent ceramics, etc., may also be used.

FIG. 1A is a view illustrating an electronic device that may include an integrated interface system with a haptic and touch pad region to which an optical module is applied, according to the present disclosure. In particular, a base part 104 of an electronic device 100 may include a top case 112 that defines a portion of an enclosure and forms or is part of an integrated interface system described herein.

The electronic device 100 may be a portable computer also known as a notebook or laptop computer, or a similar device, which includes a display part 102 and a base part 104 that is flexibly or pivotally coupled to the display part 102 (such that the display part 102, for example, can be rotated, pivoted, bent, articulated, or otherwise moved relative to the base part 104). The display part 102 includes a display, also referred to as a primary display, which provides a primary means of conveying visual information to a user, by displaying graphical user interfaces. The base part 104 is configured to receive various types of user inputs, such as keyboard inputs (e.g., typing), touch inputs (e.g., gestures, multi-touch inputs, swipes, taps, etc.), and the like. The base part 104 may also provide outputs for conveying information to the user using, for example, indicator lights, haptic output devices, displays mounted on the base part 104, etc. In some examples, providing various types of inputs and outputs through base part 104 is facilitated or enabled by using the continuous top surface on the base part 104, as described herein.

The display part 102 and the base part 104 may be coupled to each other such that they can be located on open and closed positions. In the open position, the user may be able to apply inputs to the electronic device 100 through the base part 104 and simultaneously output information on the display part 102. In the closed position, the display part 102 and the base part 104 are folded relative to each other. More specifically, the display part 102 and the base part 104 may be hinge-coupled to each other (e.g., through a pivot mechanism or hinge 103) to form a clamshell device that is movable between open and closed configurations.

Information and/or data may be transferred between the display part 102 and the base part 104. For example, display data, such as data or signals that cause the display part 102 to display images, user interfaces, application data, etc., may be transmitted from the base part 104 to the display part 102. Similarly, input data may be transmitted from the display part 102 to the base part 104. The input data may include data regarding touch inputs applied to a touch screen within the display part 102, sensor data (e.g., from sensors within the display part 102, such as light sensors, accelerometers, etc.), camera data (e.g., from a camera within the display part 102), etc. The electronic device 100 may include any suitable communication systems, for example, wired or wireless communication systems for transferring data between the display part 102 and the base part 104. The wireless communication systems may include a first transmitter/receiver in the display part 102 and a second transmitter/receiver in the base part 104 that performs communication with the first transmitter/receiver. The first and second transmitters/receivers may communicate in any suitable manner, and may use any suitable radio frequency or frequencies (e.g., 2.4 GHZ, 60 GHZ), communication protocol(s), etc. The first and second transmitters/receivers may also perform communication through an optical communication link.

Power may also be transmitted between the base part 104 and the display part 102. For example, either or both of the base part 104 and the display part 102 may include batteries or other power sources. Power may be transmitted from one part to another, as needed, based on power demands and power supplies of each part. For example, the base part 104 and display part 102 may include batteries as well as components that require power. Power may be distributed from any battery to any circuit or component requiring power, regardless of the location of the battery, circuit, or component. Power may be transmitted between the base part 104 and the display part 102 using any suitable components and techniques. For example, a wired or physical power connection may couple the display part 102 to the base part 104. As another example, power may be transmitted wirelessly through inductive or capacitive power transfer systems.

As mentioned above, the base part 104 may include a top case 112. The top case 112 may define or be a part of the integrated interface system of the electronic device 100. For example, the top case 112 may define a top outer surface of the base part 104 and may be configured to receive touch inputs, force inputs, keyboard inputs, etc. In some examples, the entire top surface (or substantially entire top surface) of the top case 112 may be sensitive to touch and/or force, and may detect touch inputs on substantially any positions along its surface including not only a keyboard zone but also peripheral zones. In cases where the entire top case 112 is sensitive to touch and force, many types of inputs are enabled through the top case 112. For example, as described herein, touch inputs, including cursor-control gestures, may be applied to any positions on the top case that includes keys of a virtual or mechanical keyboard. As another example, since force sensing systems may allow a device to distinguish a finger placed on a key from a finger actually tapping or pressing a key, an addition of force sensing across the keyboard zone as well as non-keyboard zones may facilitate detection of typing inputs when a plurality of fingers are placed on a virtual keyboard.

In addition to receiving or detecting inputs, the top case 112 may be configured to provide outputs to a user. For example, the top case 112 may have or be integrated with displays, light sources, haptic actuators, and the like, which provide outputs detectable through the top case 112 (on arbitrary positions or substantially arbitrary positions along the top surface of the top case 112). More specifically, the display may be configured to generate an image on the top case 112, and the haptic actuator may be configured to move the top case 112 in a manner of being detectable by a user who touches the top case 112. The composition and configuration of the top case 112 may facilitate and integrate these (and other) input and output functions. For example, the continuous non-conductive top case 112 (e.g., formed of a dielectric such as glass, plastic, ceramic, composites, or a combination of those materials) may allow inputs to be detected through the top case 112, and also provide an effective platform for haptic and visual outputs.

The top case 112 may define or include input zones such as a keyboard region 114 and a touch pad region 116. The keyboard region 114 may correspond to or include a virtual keyboard or a mechanical keyboard.

The top case 112 may define a continuous top surface of the base part 104, which may be a top outer surface of the base part 104. The continuous top surface (and more generally a continuous top case) may refer to a surface or member that does not have any seams, openings, through-holes, or other discontinuous portions. Accordingly, in the context of the top case 112, a continuous top case or continuous top surface may not have seams, openings, through-holes, or other discontinuous portions within a portion of the top case 112 which defines the top outer surface of the base part 104. More specifically, the top case 112 may not have openings for keys, keyboards, trackpads, buttons, etc. The top case 112 may extend substantially to outer edges of the base part 104. Accordingly, the top case 112 can suppress or reduce the possibility that liquid, dust, other contaminants, or debris are introduced into the base part 104 through the top surface of the top case 112. Additionally, the continuous surface provides a desirable aesthetic and touch-sensitive haptic and visual output surface that can utilize the exposed entire top surface of the top case 112.

The top case 112 may be formed of or include a light-transmissive material such as glass, plastic, or light-transmissive ceramic. In some examples, the top case 112 is a single glass member, a single plastic member, or a single member which is the same as a single member that is made of or includes any other suitable material. In other examples, the top case 112 may be formed of a plurality of members, which are made of the same material or different materials and bonded, adhered, fastened, or otherwise coupled together to define the top case 112.

In some examples, all or a portion of the top case 112 may be masked to form opaque zones. Masking may be performed by any suitable techniques, such as depositing an ink, dye, or film, or otherwise placing an opaque material beneath the top case 112 (and on any other components or layers that are intended to remain hidden or blocked). The masking or other opaque material or layer may have any desired color. In fact, because the top case 112 may be light-transmissive (e.g., transparent), there may be fewer restrictions on achievable colors than those in the related art devices. For example, certain colors, finishes, or other optical treatments may be difficult or impossible to be achieved in an uncoated opaque plastic material. By using the light-transmissive or transparent top case 112, it may be possible to achieve devices with more available colors and/or finishes (e.g., mirror finishes, metal flake finishes, etc.). In some examples, images, photos, paintings, or other graphic contents may be viewed through the light-transmissive top case 112.

The touch pad region 116 may be configured to detect a touch-based input and/or a force-based input, and may be or may include an arbitrary portion of the top case 112 substantially including the entire top case 112, which includes a keyboard region 114, a trackpad zone, a virtual key zone, optional sidewalls of the top case, or an arbitrary other portion of the top case 112. In some examples, substantially the entire top case 112 may define a touch-sensitive input zone from edge to edge. In this manner, and as discussed herein, touch or trackpad inputs such as clicks, taps, gestures (e.g., swiping, pinching), and multi-touch inputs may be detected on an arbitrary portion of the top case 112 including the keyboard region 114. Additionally, even if the keyboard region 114 includes mechanical key mechanisms, the touch pad region 116 may detect touch inputs (e.g., gestures) applied directly to keycaps rather than to the top case 112. As used herein, the term "key" refers to a mechanical key, a virtual key (e.g., a key displayed by an underlying display), or a key zone (e.g., defined by a mask layer on the top case), any other suitable types of keys described herein, any associated mechanisms, keycaps, or support structures.

The electronic device 100, particularly the top case 112, may also include or define output zones, such as visual-output zones and haptic-output zones. The haptic-output zones include zones of the top case 112 that can be moved or otherwise induce tactile sensations to the user. The visual-output zones include zones in which visual outputs are generated (e.g., to display virtual and/or dynamic keys), such as zones associated with lights or displays. Exemplary visual- and haptic-output zones as well as components for generating visual and haptic outputs are described herein.

Accordingly, the electronic device 100 may include a top case that defines an integrated interface system that provides various input and output functions including keyboard inputs, touch inputs, visual outputs, and haptic outputs.

Figure 1B:
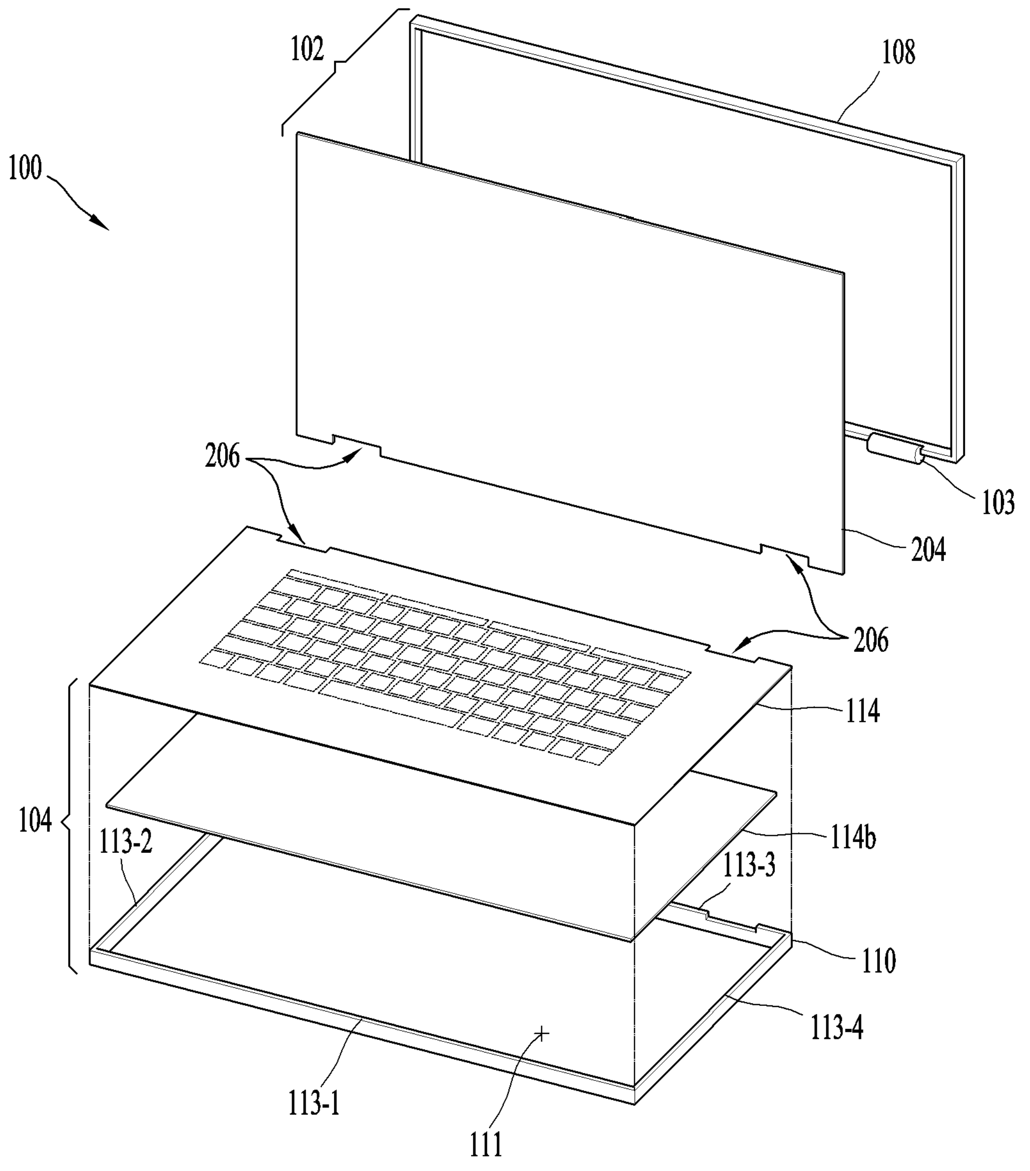
FIG. 1B is a partially exploded view of an electronic device according to the present disclosure.

FIG. 1B is a partially exploded view of an electronic device according to the present disclosure. As described above, the electronic device 100 includes the top case 112 that forms part of the enclosure defining the base part 104, and also defines the top outer surface of the base part 104, which also acts as an input surface of the integrated interface system for receiving user inputs. As illustrated in FIG. 1B, the base part 104 may be pivotally coupled to the display part 102 to form a foldable or clamshell type notebook computer.

As illustrated in FIG. 1B, the display part 102 includes a display 204 coupled to a display housing 108. The display 204 may include various display components, such as liquid crystal display (LCD) components, light source(s) (e.g., light emitting diodes (LEDs) or organic LEDs (OLEDs)), filter layers, polarizers, light diffusers, covers (e.g., glass or plastic cover sheets), etc. More specifically, in some examples, the display 204 includes a display stack (e.g., including an LCD, polarizing films, light diffusing films, and/or rear or side light), and a cover disposed on the display stack and forming an external user-facing surface of the display 204. In other examples, the display 204 includes the display stack as described above, but does not include a separate cover. In such cases, a side portion or surface of the LCD panel of the display stack may form the external user-facing surface of the display 204. The display part 102 may also include other components, such as structural components that support any of the components described above, batteries, wired or wireless communication components, processors, a memory, etc.

The display part 102 may include mechanisms 103 or portions thereof coupled to or integrally formed with the display part 102. For example, the display housing 108 may include hinges (or portions thereof) that are welded, soldered, adhered, or otherwise attached to the display housing 108. The display 204 and the top case 112 may include feature portions 206 (such as notches illustrated in FIG. 1B) which allow the disposition of the mechanisms 103 while allowing the display 204 and the top case 112 to define substantially the entire user interface surfaces of the display part 102 and the base part 104.

The base part 104 may include a bottom case 110 and the top case 112 described above, both of which define the interior volume of the base part 104. The base part 104 may also include, in its interior volume, components 114*b*, such as processors, memory devices, circuit boards, input/output devices, haptic actuators, wired and/or wireless communication devices, communication ports, disk drives, etc. As described above, the top case 112 may be a continuous surface (e.g., without any holes or openings in its top surface) which reduces the possibility of damages on the components 114*b* by suppressing or restricting an introduction of liquids, debris, or other contaminants into the interior volume.

The bottom case 110 may include a bottom member 111 and one or more side walls 113-1 to 113-4. In some examples, the bottom case 110 has one, two, three, or four side walls. When the bottom case has three side walls, the side wall 113-3 may be omitted. When the bottom case has two side walls, the side walls 113-2 and 113-4 may be omitted. When the bottom case has one side wall, the only side wall may be the side wall 113-1. Of course, other configurations of the side walls are also possible.

The bottom case 110 may be formed of or include any suitable material. For example, the bottom case 110 may be formed of or include a metal (e.g., steel, aluminum, or titanium), glass, plastic, ceramic, composite, or any other suitable material or a combination of these or other materials. In some examples, the bottom case 110 is a single (e.g., monolithic) component or member, for example, a single sheet of glass, metal, plastic, etc. For example, the bottom case 110 may be a single component formed of a single piece of metal and may be formed by stamping, drawing, machining, hydroforming, molding, or any other suitable process. When the bottom case 110 is a single component, the bottom member 111 and side wall(s) 113 may be an integral structure (e.g., a monolithic component).

The top case 112 may be coupled to the bottom case 110 in any suitable manner. Various examples of coupling between the top case 112 and the bottom case 110, and various configurations and shapes of the top and bottom cases 112 and 110 will be described herein. Similarly, exemplary configurations of the display 204 and the display housing 108 (and techniques for combining them) will be described herein.

Figure 2:
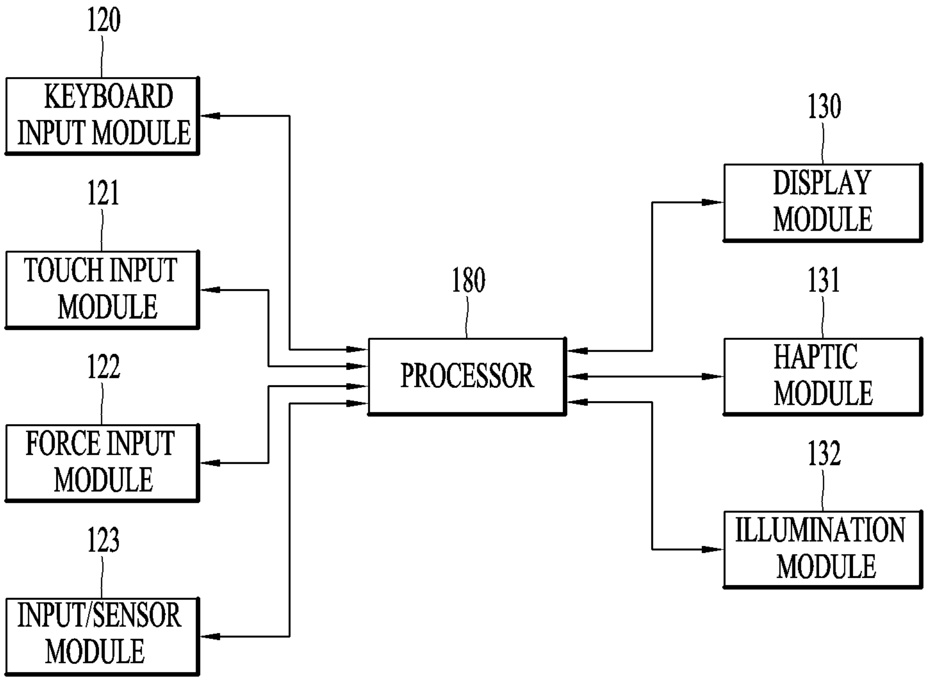
FIG. 2 is a view illustrating the configuration of an exemplary integrated interface system for an electronic device according to the present disclosure.

Meanwhile, FIG. 2 is a view illustrating the configuration of an exemplary integrated interface system for an electronic device according to the present disclosure. Functions of an integrated interface system may be performed by any of components and structures described herein, which include haptic sensors, force sensors, haptic actuators, displays, mechanical keys, light sources, etc., and examples thereof will be described herein.

Referring to FIG. 2, the integrated interface system may be configured to include a keyboard input module 120, a touch input module 121, a force input module 122, and an input and/or sensor module 123. The integrated interface system may be configured to further include a display module 130, a haptic module 131, and an illumination module 132. The processor 180 may be operably coupled to each module constituting the integrated interface system. The processor 180 may be operably coupled to the keyboard input module 120, the touch input module 121, the force input module 122, and the input and/or sensor module 123. The processor 180 may be operably coupled to the display module 130, the haptic module 131, and the illumination module 132.

The integrated interface system provides a keyboard input module 120. The keyboard input module 120 includes detections of key-based or similar inputs including inputs (e.g., alphanumerical and/or symbolic character inputs, function key selections, or arrow key selections) which are typically applied through a keyboard. A device (e.g., the electronic device 100) may use any suitable input mechanism(s), such as mechanical keys, haptic sensors, force sensors, displays, etc., to operate the keyboard input module 120. When the device includes mechanical keys or key mechanisms, the keyboard input module 120 includes detection of physical movements of the key mechanisms. When the device includes virtual keys, the keyboard input module 120 may include detection of touch or force inputs on the virtual keys. In either example, the keyboard input module 120 may detect keyboard inputs through an input surface (such as the top case 112 in FIG. 1A).

The integrated interface system also provides a touch input module 121. The touch input module 121 includes detection of touch-based inputs such as clicks, taps, gestures (e.g., swiping, pinching), multi-touch inputs, etc. These inputs may be similar to or include inputs detected by a trackpad in the related art. For example, such inputs may include gestural inputs that may be used to control a cursor or element of a graphical user interface on the display of the device. The device (e.g., the electronic device 100) may use any suitable input mechanism(s), such as capacitive haptic sensors, resistive haptic sensors, sonic sensors, etc., to operate the touch input module 121. Such mechanisms may be associated with or cover substantially the entire user-facing portion of the top case 112. In this way, the touch input module 121 may detect touch inputs applied to arbitrary positions on the top case 112 (e.g., including a mechanical or virtual keyboard, a trackpad zone below the mechanical or virtual keyboard, and/or portions of the top case adjacent to side portions of the mechanical or virtual keyboard).

The touch input module 121 may include detection of touch inputs received on a keyboard zone of the top case 112 (e.g., the keyboard region 114 in FIG. 1A). The keyboard zone, as described above, may correspond to a keyless surface of a virtual keyboard or may correspond to a zone of the top case 112 including mechanical keys. In either example, the touch input module 121 may include detection of touch inputs, such as clicks, taps, gestures (e.g., swiping, pinching), and multi-touch inputs, which are applied to the keyboard zone. When mechanical keys or key mechanisms are used, the touch input module 121 may include detection of touch inputs through the mechanical keys or mechanisms.

The touch input module 121 may also include detection of touch inputs applied to a non-key zone of the top case 112. For example, arbitrary zones of the top case 112 that do not correspond to the keyboard zone (non-keyboard zone) may be configured to receive touch inputs, and the device may also detect touch inputs in these zones.

The integrated interface system also provides a force input module 122 that includes detection of force inputs and/or force components of touch inputs. The device (e.g., the electronic device 100) may use any suitable force sensors to provide the force input module 122. The force input module 122 may include detection of force inputs on any position on the top case 112. For example, substantially the entire top surface of the top case 112 may be configured to receive and/or detect force inputs applied to substantially any position on the top surface of the top case 112. Additionally, when the top case 112 includes a dielectric surface or is formed of a dielectric sheet (e.g., glass, plastic, ceramic, etc.), the dielectric and/or mechanical properties (or other properties) of the dielectric material may facilitate detection of force inputs at any suitable position on the top case (e.g., on the keyboard region 114, a non-keyboard zone, or any other suitable position).

The integrated interface system also provides a display module 130 that includes output of images or other visual information through the top case 112. For example, the device (e.g., the electronic device 100) may include or communicate with displays that are disposed within the electronic device 100 and generate images to be viewable on the top case 112, and accordingly provides the display module 130. The displays may be used to generate images of keys (or other affordances) for the keyboard region 114, for example. The displays may also be used to define input zones, buttons, or other affordances or display other graphical objects (e.g., image, videos, text, user interfaces, etc.) at arbitrary positions on the top case 112 (e.g., to indicate a position and/or function of an input). The top case 112 may be formed of glass or other transparent material. Accordingly, the top case 112 can operate as a screen even on opaque surfaces, such as a portion bordering a keyboard or a trackpad, in the electronic device. To this end, the displays may be integrated with the top case 112.

The integrated interface system also provides a haptic module 131 that includes generation of haptic or tactile outputs on the top case 112. The device (e.g., the electronic device 100) may use haptic actuators to operate the haptic module 131. The haptic actuators may be coupled to the top case 112, or otherwise may cause the top case 112 to be physically moved so as to generate haptic outputs on the top case 112. The haptic outputs may be used for various purposes, such as indicating that a touch input (e.g., key selection or trackpad selection) has been detected by the electronic device 100.

The integrated interface system also provides an illumination module 132 that includes illumination of zones or elements of the top case 112. The device (e.g., the electronic device 100) may use light sources to provide lighting (illumination) functionality. For example, a glass, plastic, or otherwise light-transmissive top case (e.g., the top case 112) may act as a light guide. For example, the glass or light-transmissive (e.g., transparent or translucent) top case 112 may act as a light guide to guide light from a light source toward other zones of the electronic device 100, such as bottoms or surroundings of keycaps or other key mechanisms. Additionally, when the top case 112 has completely transparent or transparent portions, the transparent portions may allow images from the underlying displays to pass through the top case 112, which is not possible in opaque top cases. The illumination module 132 may also provide backlighting or other lighting for the displays.

The integrated interface system also provides one or more additional input and/or sensor modules 123. The device (e.g., the electronic device 100) may use any suitable components to receive inputs (e.g., from a user or another computer, device, system, network, etc.) or detect any appropriate attributes or parameters of the device, a surrounding environment of the device, and people or objects interacting with the device (or near the device). For example, the device may include accelerometers, temperature sensors, position/orientation sensors, biometric sensors (e.g., fingerprint sensors, venous wave, blood-oxygen sensors, blood sugar sensors, etc.), eye-tracking sensors, retinal scanners, humidity sensors, buttons, switches, lid-closure sensors, etc. Such sensors and/or input devices may be located on any suitable portions of the device or on any suitable locations within the device. For example, the sensors and/or input devices may be located on the display part 102 or the base part 104 (or they may include components in both the display part 102 and the base part 104). The input and/or sensor module 123 may use network and/or communication systems in order to receive commands, data, information, contents (e.g., audio, video, images, web data, etc.), and the like from other devices or systems, to provide input and/or sensing functionality.

Hereinafter, an electronic device having a haptic and touch pad region to which an optical module is applied according to the present disclosure will be described. In this regard, currently, touch interfaces are provided in many electronic devices. For example, touch screens are disposed as touch interfaces in not only portable electronic devices such as mobile phones, smart phones, tablet computers, laptop computers, personal digital assistants (PDAs), portable multimedia players (PMPs), digital cameras, portable game consoles, MP3 players, etc., but also electronic devices implemented as stationary terminals such as automated teller machines (ATMs), information retrieval machines, unmanned ticket machines, etc.

In conjunction with these touch interfaces, a haptic technology, which provides a sense of touch to a user as a way to enhance user experience, is attracting attention. Upon using such a haptic technology, various types of tactile sensations are provided to a user when the user interacts with digital objects, ultimately providing feedback that combines vision and tactile senses. Electronic devices using the haptic technology can provide users with more realistic touch interfaces than existing electronic devices.

Meanwhile, such a touch interface may be provided in an electronic device implemented as a mobile terminal. Among electronic devices implemented as mobile terminals, laptop computers may be provided with a touch pad region in a separate area from a display. There is a need to intuitively provide the user with information as to whether a touch input has been properly applied to the touch pad region.

Figure 3:
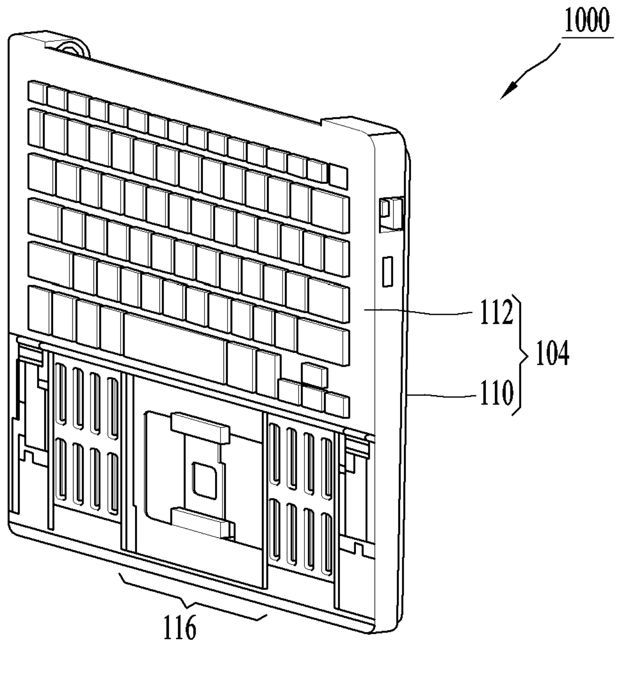
FIG. 3, including (a) and (b), illustrate a lateral perspective view and a rear perspective view of an electronic device having a touch pad region according to the present disclosure.
Figure 3:
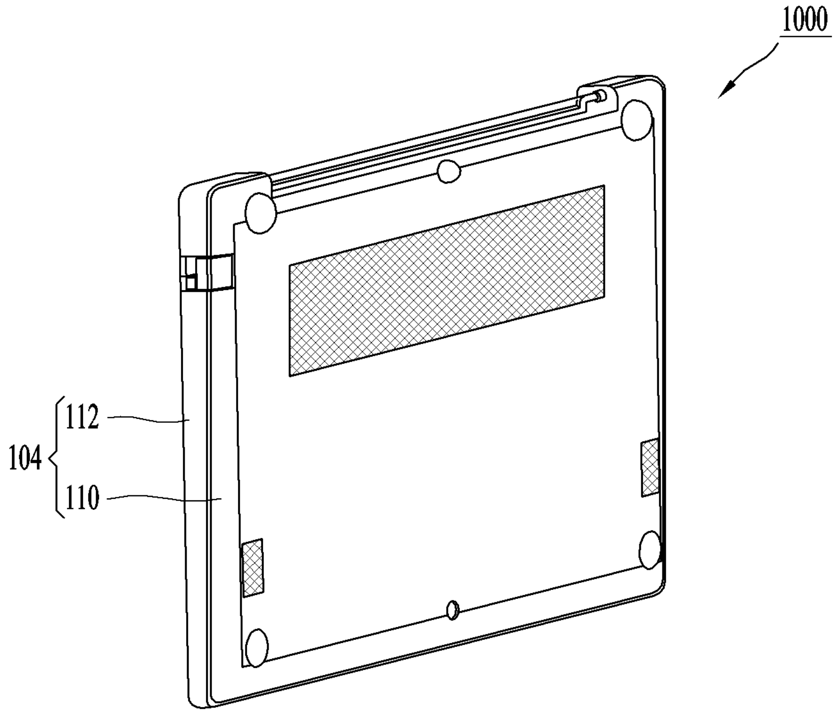
Figure 4:
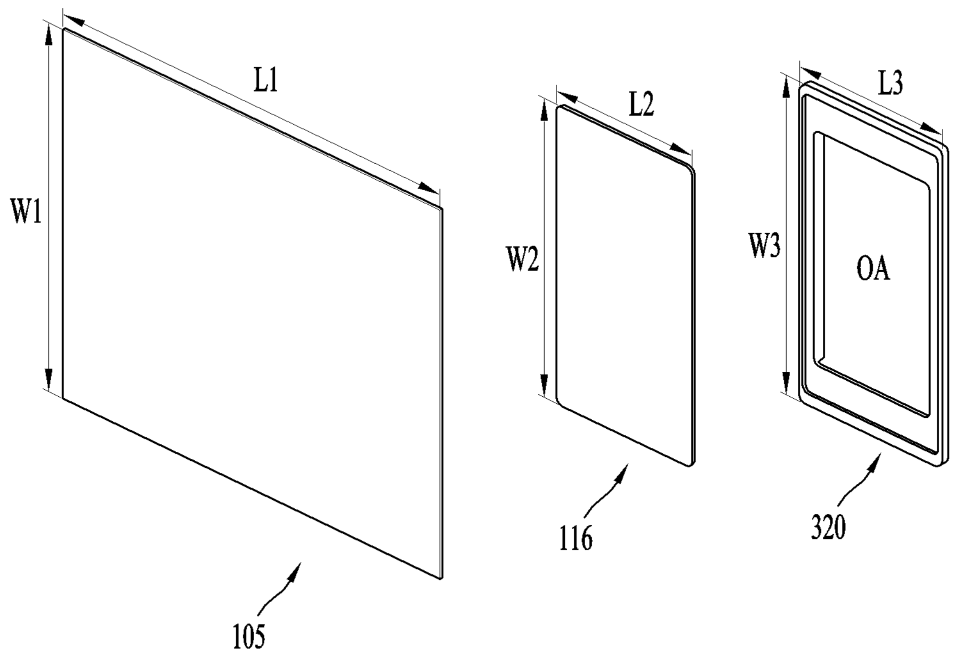
FIG. 4, including (a) and (b), illustrate an exploded perspective view illustrating components constituting the touch pad region of FIG. 3.
Figure 4:
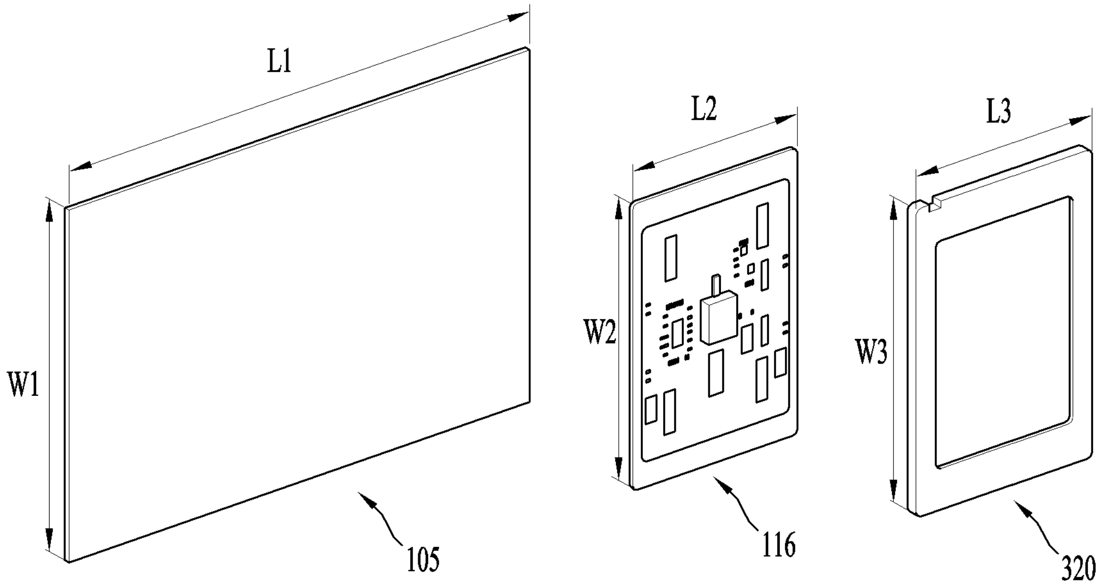

Hereinafter, an electronic device having a haptic and touch pad region to which an optical module is applied according to the present disclosure will be described in more detail, with reference to the accompanying drawings. In this regard, FIG. 3 is a lateral perspective view and a rear perspective view of an electronic device having a touch pad region according to the present disclosure. FIG. 4 is an exploded perspective view illustrating components constituting the touch pad region of FIG. 3.

(a) of FIG. 3 is a lateral perspective view of the electronic device 100 having the touch pad region according to the present disclosure. (b) of FIG. 3 is a rear perspective view of the electronic device 100 having the touch pad region according to the present disclosure. Referring to (a) and (b) of FIG. 3, the base part 104 of the electronic device 100 may be configured to include a top case 112 and a bottom case 110. The top case 112 and the bottom case 110 may be implemented as separate cases, and the top case 112 and the bottom case 110 may be configured to be coupled to each other. As another example, the base part 104 including the top case 112 and the bottom case 110 may be implemented as a single body (unibody). Referring to (b) of FIG. 3, a user input region of the base part 104 may be configured to include a keyboard region 114 and a touch pad region 116.

(a) of FIG. 4 is a front view illustrating a dielectric mold part 105, the touch pad region 116, and a light emitting region part 320 sequentially stacked on the bottom region of the base part 104 in (a) of FIG. 3. (b) of FIG. 4 is a rear view illustrating the dielectric mold part 105, the touch pad region 116, and the light emitting region part 320 sequentially stacked on the lower region of the base part 104 in (a) of FIG. 3. The dielectric mold part 105 may have front and back surfaces formed of a transparent material. The dielectric mold part 105 may have a first length L1 and a first width W1 to cover the entire bottom region of the base part 104.

The touch pad region 116 may have a second length L2 and a second width W2 to cover a partial region of the bottom region. The touch pad region 116 may be a region on which the user can actually apply a touch and may be referred to as a touch pad region. A substrate 340 may be disposed on the rear surface of the touch pad region 116, and a front surface of the substrate 340 may be made of a touchable material. Accordingly, the touch pad region 116 may be implemented as a touch pad module that includes a component capable of detecting a touch input and the substrate 340 on which the component is disposed.

The second length L2 of the touch pad region 116 may be shorter than the first length L1. The second width W2 of the touch pad region 116 may be shorter than the first width W1. Accordingly, only a portion of the bottom region of the base part 104 may be formed as the touch pad (active) region 116 to which a touch input can be applied.

The light emitting region part 320 may be formed in a rectangular shape with a hollow inside to surround the touch pad region 116. The light emitting region part 320 may be formed as an open area OA with the hollow inside. An outer portion of the light emitting region part 320 may be formed to have a third length L3 and a third width W3. An inner portion of the light emitting region part 320 may have a second length L2 and a second width W2, so that the touch pad region 116 can be inserted and coupled through the open area OA. However, the inner portion of the light emitting region part 320 is not limited to this and may alternatively be formed to be smaller than the second length L2 and the second width W2 in consideration of tolerances when coupled.

Hereinafter, an electronic device having a haptic and touch pad region according to the present disclosure will be described in detail, with reference to FIGS. 1A to 4. The electronic device 100 may be configured to include a display 130 and a base part 104.

The display 130 may be configured to display screen information. The base part 104 may be operably coupled to the display 130. The base part 104 may include a keyboard region 114 and a touch pad region 116. The touch pad region 116 may be a region on which a user's touch input is detected and may be referred to as a touch pad region. As described above, the base part 104 may be configured to include a dielectric mold part 105, a touch pad region 116, and a light emitting region part 320.

Meanwhile, in an electronic device having a keyboard region, a touch pad region may be formed integrally with a peripheral region. The keyboard region of the electronic device corresponds to a keyboard deck, which is a top case. A rectangular touch pad region is formed around the keyboard region to move a cursor on a screen of the electronic device.

The touch pad region requires electrostatic performance and a physical click action, so separate components may be assembled and exposed to outside. This deviates from the simplicity of the design look. Therefore, a haptic module that provides haptic feedback in response to a touch input in the touch pad region needs to be applied. Additionally, a seamless design can be implemented by attaching glass to a large area of the touch pad region and the peripheral region.

Meanwhile, the glass disposed in the large area of the touch pad region and peripheral region configures the bottom region of the electronic device. Accordingly, a boundary between an upper keyboard area of the keyboard region and a component is exposed, and thereby the simplicity of the design cannot be perfectly implemented. Therefore, the present disclosure provides an electronic device that adopts outsert molding to a touch pad region and has a keyboard region formed integrally so that there are no boundaries between the touch pad region and a peripheral region and between a lower region and an upper region. In this regard, a completely seamless design can be achieved through a painting process such that there are no boundaries between the touch pad region and the peripheral region and between the lower and upper regions. Accordingly, the touch pad region and the peripheral region may be formed integrally with each other so that the touch pad region and the peripheral region are not distinguishable with the naked eye.

The present disclosure is to solve the above-mentioned problems and other drawbacks, and an aspect of the present disclosure is to provide an electronic device including a keyboard region in which a touch pad region and a peripheral region are integrally formed without a boundary therebetween. Another aspect of the present disclosure is to provide a completely seamless design through a painting process so that there is no boundary between a touch pad region and a peripheral region. Still another aspect of the present disclosure is to provide feedback on whether a user input has been normally applied through a haptic element disposed below a touch pad region.

Figure 5:
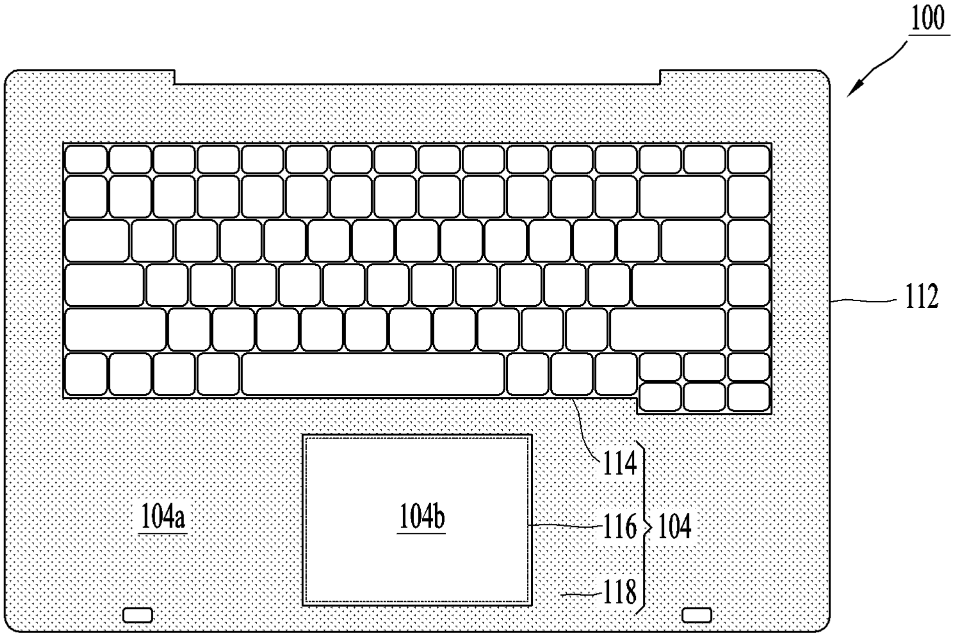
FIG. 5, including (a) and (b), are views illustrating a structure in which a top case of an electronic device with a keyboard region is formed as a metal case and coated with a coating layer.
Figure 5:
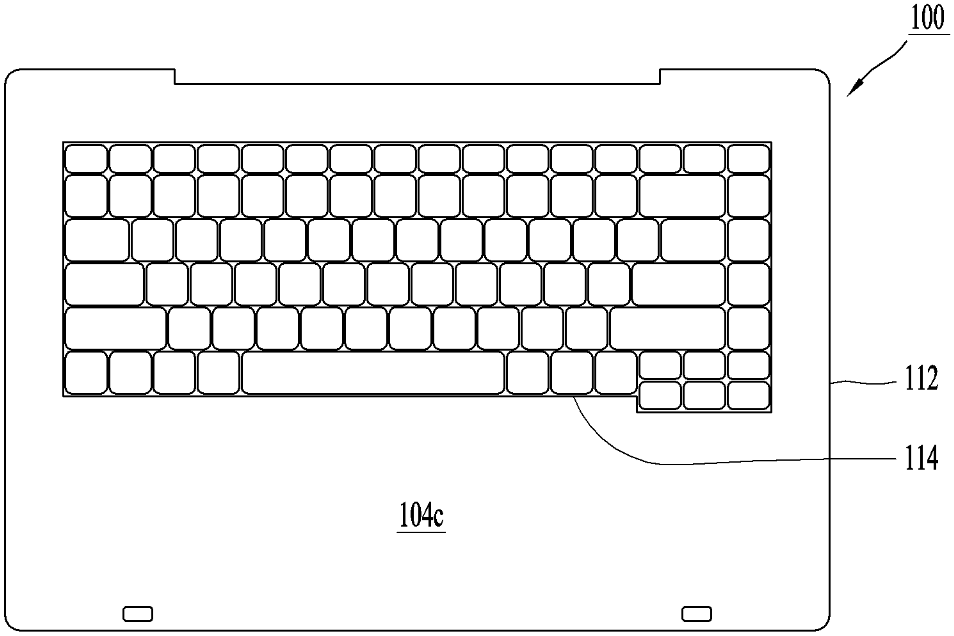

In this regard, FIG. 5 is a view illustrating a structure in which a top case of an electronic device with a keyboard region is formed as a metal case and coated with a coating layer. (a) of FIG. 5 illustrates a structure in which the top case of the electronic device 100 including the keyboard region 114 is formed as a metal case. (b) of FIG. 5 illustrates a structure in which the top case formed as the metal case is coated with a coating layer 104*c*.

Referring to (a) of FIG. 5, the base part 104 may be configured to include a keyboard region 114, a touch pad region 116, and a peripheral region 118 surrounding the keyboard region 114 and the touch pad region 116. The base part 104 may be configured to include a first region 104*a* formed as a metal case made of a metal and a second region 104*b* formed by removing at least a portion of the metal case. The touch pad region 116 may be formed on the second region 104*b*, which is formed by removing at least the portion of the metal case, to detect a user's touch input.

The base part 104 of the electronic device may correspond to the top case 112. Glass may also be attached to the top case 112, which corresponds to a keyboard deck, to implement a seamless design. When glass is attached to the bottom of the keyboard region 114 of the top case 112, a boundary between the touch pad region 116 and the peripheral region 118 is deleted. However, a boundary may still be exposed between the glass attached to the bottom of the keyboard region 114 and a region corresponding to the keyboard region 114. Accordingly, a material of the glass attached to the bottom of the keyboard region 114 and a material of the region surrounding the keyboard region 114 are different from each other, which may cause a sense of difference. In this regard, a first structure on the bottom of the keyboard region 114 and a second structure on the region surrounding the keyboard region 114 may be assembled to each other. When assembling the first and second structures, a boundary may be exposed due to a gap between the first and second structures. Additionally, when assembling the first and second structures, surface colors may be different due to the different materials, which may cause a sense of difference.

Therefore, the present disclosure desires to implement a structure that integrate the first structure on the bottom of the keyboard region 114 and the second structure on the region surrounding the keyboard region 114. In this regard, the first structure on the bottom of the keyboard region 114 and the second structure on the region surrounding the keyboard region 114 may be implemented as a metal case. In this regard, magnesium (Mg), a metal material, may be applied to a keyboard deck structure in order to reduce product weight and provide high rigidity. A capacitive touch, which is a function of a touch pad disposed on the touch pad region 116, operates only when a non-metal material is applied. If the entire keyboard deck structure is produced as a metal case made of Mg, a touch function cannot be implemented, so a non-metal material must be applied to a touch region.

A metal material must be used in the keyboard deck structure, and an outsert molding process must be applied to the touch pad region 116 to implement the touch function. However, the boundary is still exposed as the metal structure and the non-metal structure are coupled to each other. To compensate for this, the boundary may be hidden by using a painting method among various post-processing methods. In addition, coating layers of various colors may be implemented through the painting method.

Meanwhile, at least portion of the metal structure of the touch pad region 116 may be removed in order to recognize the user's touch input. In the region where the metal structure has been removed from the touch pad region 116, a structure made of a plastic material may be implemented integrally with a surrounding metal structure through outsert molding.

The second region 104*b*, from which the metal case has been removed, may be molded with a plastic material through outsert molding. A dielectric mold part may be formed on the second region 104*b* by molding the plastic material. Meanwhile, movement of a cursor, which is a unique function of the touch pad formed on the touch pad region 116, may be implemented using a capacitive touch method. Since capacitive touch is not operated by a metal material, a non-metal material such as plastic, glass, or wood must be applied to the touch pad region 116, which is the second region 104*b*. Accordingly, the touch pad region 116 of the second region 104*b* formed of the non-metal material such as plastic, glass, or wood is a region required to recognize and operate the touch function.

Even if outsert molding is performed, a boundary between a metal region and a dielectric region is still exposed, and the boundary needs to be implemented to be hidden in order to achieve a seamless design. To this end, among various post-processing methods, the painting method may be employed to remove the boundary and implement various colors, so as to create a simple and luxurious design.

In this regard, referring to (a) and (b) of FIG. 5, a coating layer 104*c* may be formed on the entire region of the first region 104*a* and the second region 104*b* of the base part 104.

Accordingly, the boundary between the touch pad region 116 of the dielectric region and the peripheral region 118 of the metal region can be hidden.

Meanwhile, the coating layer 104*c* may be formed of a transparent or translucent coating material, and a light-emitting region may be formed by a light-emitting element disposed along the side surface of the touch pad region 116. The coating layer 104*c* may also be formed of an opaque coating material, so that the touch pad region 116 can be implemented without a light-emitting region. The coating layer 104*c* may be implemented in a spraying manner, so as to be coated with a uniform thickness on the entire region of the first region 104*a* and the second region 104*b* of the base part 104.

However, the coating layer 104*c* may not be limited to being implemented in the spraying manner, and may alternatively be implemented as a liquid coating layer formed in a roller coating or flow coating manner. The coating layer 104*c* may be implemented as a vapor phase coating layer through vacuum deposition, sputtering, ion plating, plasma polymerization, etc. The coating layer 104*c* may also be implemented using a multilayer (co)-extrusion method.

Meanwhile, in order to implement a cursor movement operation among the roles of the touch pad formed on the touch pad region 116, a physical click operation is required for user input to be applied to the touch pad region 116. In this regard, a dome-type touch pad region 116 may also be applied to enable a physical click on the touch pad region 116. However, when outsert molding is applied to the touch pad region 116, the physical click on the touch pad region 116 and resulting feedback are not easy, so a function to compensate for this is needed. Therefore, hardware implementation is necessary, so that click feeling can also be provided through the haptic motor of the haptic module.

Figure 6:
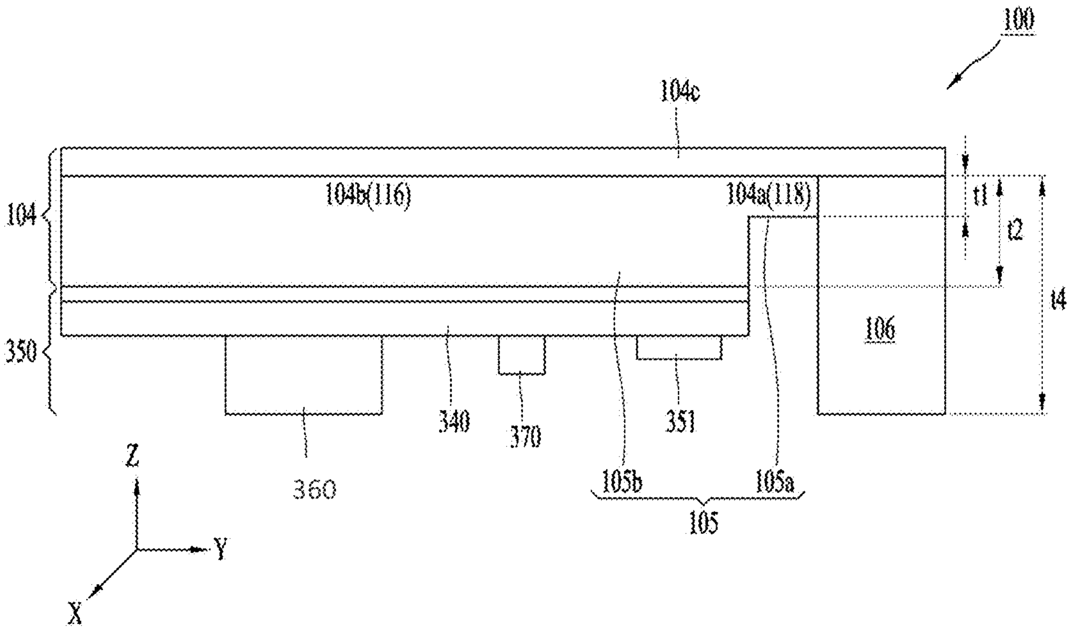
FIG. 6 is a cross-sectional view illustrating an electronic device in which a dielectric mold part is formed on a touch pad region according to one embodiment.

In this regard, FIG. 6 is a cross-sectional view illustrating an electronic device in which a dielectric mold part is formed on a touch pad region according to one embodiment. Referring to FIGS. 1A to 6, the electronic device 100 having the keyboard according to the present disclosure will be described. The electronic device 100 may be configured to include a display 130 and a base part 104. The electronic device 100 may be configured to further include a haptic module 350.

The display 130 may be configured to display screen information. The base part 104 may be operably coupled to the display 130. The base part 104 may be configured to have the keyboard region 114 and may be configured to detect a touch input. The base part 104 configured to detect a touch input may include the touch pad region 116 and a peripheral region 118. The peripheral region 118 may be formed to surround the touch pad region 116 and the keyboard region 114.

The base part 104 may be configured to include the plurality of regions and the coating layer 104*c*. The base part 104 may be configured to include a first region 104*a*, a second region 140*b*, and a coating layer 104*c*.

The first region 104*a* may be formed as a metal case made of a metal formed on the peripheral region 118. The second region 104*b* may be formed by removing at least a portion of the metal case to correspond to the touch pad region 116. The dielectric mold part 105 may be disposed on the second region 104*b* where at least the portion of the metal case has been removed.

The coating layer 104*c* may be disposed on the upper area of the first region 104*a* and the upper area of the second region 104*b*. The coating layer 104*c* may be disposed on the upper area on a Z-axis with respect to the first region 104*a* and the second region 104*b*. The coating layer 104*c* may be formed on the upper area of the first region 104*a* and the upper area of the second region 104*b* to hide the boundary between the metal case and the dielectric mold part 105. The coating layer 104*c* may be formed on both the touch pad region 116 and the peripheral region 118.

The second region 104*b* of the base part 104 may be formed of the dielectric mold part 105 with the metal case removed. The touch pad region 116 corresponding to the second region 104*b* of the base part 104 may be formed as the dielectric mold part 105 made of a non-metal material at the same position as the upper area of the metal case. The coating layer 104*c* may be disposed on the upper area of the dielectric mold part 105 and the upper area of the metal case, such that the boundary between the first region 104*a* and the second region 104*b* is hidden. The coating layer 104*c* may be disposed on the upper area of the dielectric mold part 105 and the upper area of the metal case to hide the boundary between the metal case and the dielectric mold part 105.

The haptic module 350 may be disposed below the dielectric mold part 105 on the Z-axis. The haptic module 350 may detect a touch input applied to a touched region of the touch pad region 116 and control the touched region to vibrate.

The dielectric mold part 105 may be configured to include a plurality of parts formed at different heights. The dielectric mode part 105 may be configured to include a first portion 105*a* and a second portion 105*b*. The first portion 105*a* of the dielectric mold part 105 may be coupled to the metal case of the first region 104*a*. The second portion 105*b* of the dielectric mold part 105 may be stacked on the substrate 340 of the haptic module 350.

The top of the first portion 105*a* and the top of the second portion 105*b* of the dielectric mold part 105 may be disposed at the same position on the Z-axis. This can achieve a uniform surface height of the coating layer 105*c* formed above the first region 104*a* and the second region 104*b*. Accordingly, the coating layer 104*c* may be formed on the upper area of the first region 104*a* and the upper area of the second region 104*b* to hide the boundary between the metal case and the dielectric mold part 105.

A second thickness t2 of the second portion 105*b* of the dielectric mold part 105 may be thicker than a first thickness t1 of the first portion 105*a*. The metal case 106 formed on the first region 104*a* may extend up to an end portion of the coating layer 104*c*. The metal case 106 formed on the first region 104*a* may be coupled to the first portion 105*a* of the dielectric mold part 105. One end portion of the metal case 106 may extend up to another end portion of the first portion 105*a* of the dielectric mold part 105. The top of the metal case 106 may be coupled to the coating layer 104*c*.

The metal case 106 formed on the first region 104*a* may be formed to have a fourth thickness t4. The fourth thickness t4 of the metal case 106 may be thicker than the first thickness t1 of the first portion 105*a* of the dielectric mold part 105. The fourth thickness t4 of the metal case 106 may be thicker than the second thickness t2 of the second portion 105*b* of the dielectric mold part 105.

Figure 7:
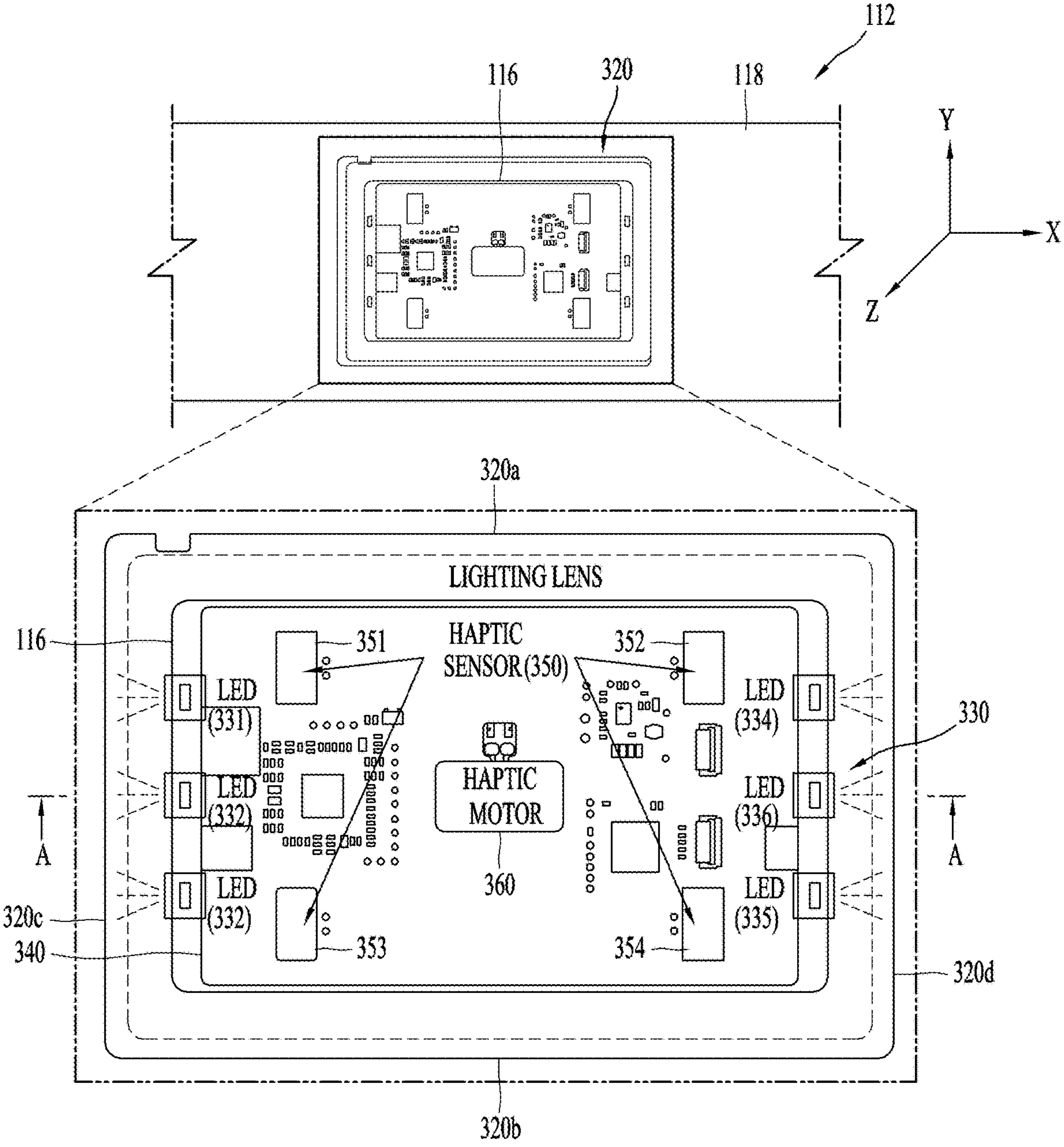
FIG. 7 is a view illustrating a substrate disposed below a touch pad region and components disposed on the substrate, according to the present disclosure.

In this regard, FIG. 7 is a view illustrating a substrate disposed below a touch pad region and components disposed on the substrate, according to the present disclosure. Referring to FIG. 7, the touch pad region 116 and the peripheral region 118 may be formed on the lower area of the keyboard region in a Y-axis direction of the top case 112 of the electronic device. The substrate 340 capable of providing haptic feedback may be disposed in the Z-axis direction of the touch pad region 116.

Referring to FIGS. 1A to 7, the light emitting region part 320 may also be formed on the top case 112 including the touch pad region 116 and the peripheral region 118. The light emitting region part 320 may be formed to surround the touch pad region 116. The light emitting region part 320 may be formed along the side areas of the touch pad region 116. The light emitting region part 320 may be disposed below the peripheral region 118 in the Z-axis direction. The light emitting region part 320 may be disposed below the peripheral region 118 in the Z-axis direction between the touch pad region 116 and the metal case 106.

In this regard, the coating layer 104*c* formed above the light emitting region part 320 in the Z-axis direction may be configured as a transparent layer or a translucent layer. The coating layer 104*c*, which is the transparent layer or the translucent layer, may be formed to transmit light from the light source 330. The touch pad region 116 and the light emitting region part 320 may be formed on the rear surface of the coating layer 104*c*.

An opaque layer may be disposed below the touch pad region 116 in the Z-axis direction. The opaque layer may be disposed below the coating layer 104*c* of the transparent layer or translucent layer to block light from the light source 330. The opaque layer may be disposed on both sides below the coating layer 104*c* of the transparent layer or the translucent layer. Accordingly, light from the light source 330 can be blocked at both side regions where the opaque layer is disposed. On the other hand, light from the light source 330 may be transmitted through a central slot region where the opaque layer is not disposed.

The light emitting region part 320 may be configured to include a top region 320*a*, a bottom region 320*b*, one side region 320*c*, and another side region 320*d*. The top region 320*a* of the light emitting region part 320 may be coupled to an upper end portion of the substrate 340. The bottom region 320*b* of the light emitting region part 320 may be coupled to a lower end portion of the substrate 340. The one side region 320*c* of the light emitting region part 320 may be coupled to one end portion of the substrate 340. The another side region 320*d* of the light emitting region part 320 may be coupled to another end portion of the substrate 340.

The top region 320*a* may be connected to the one side region 320*c* and the another side region 320*d*. The top region 320*a* may be integrally connected to the one side region 320*c* and the another side region 320*d*. The bottom region 320*b* may be connected to the one side region 320*c* and the another side region 320*d*. The bottom region 320*b* may be integrally connected to the one side region 320*c* and the another side region 320*d*.

At least one light source 330 may be configured to include a plurality of light emitting elements 331 to 336. The light emitting elements 331 to 336 may be disposed on top, bottom, and central regions in a second axial direction of one side and another side in a first axial direction of the substrate 340 that is disposed on the touch pad region 116.

The number of light emitting elements is not limited to six illustrated in FIG. 7 and may change depending on an application. As an example, the first and second light emitting elements 331 and 332 may be disposed on an upper left region and a lower left region, and the third and fourth light emitting elements 333 and 334 may be disposed on an upper right region and a lower right region. The fifth and sixth light emitting elements 335 and 336 may be further disposed on a central left region and a central right region. As another example, the first to fourth light emitting elements 331 to 334 may be disposed, and other light emitting elements (for example, the fifth and sixth light emitting elements) may further be disposed on the upper and lower areas of the substrate 340.

The haptic module 350 may be configured to include a first haptic sensor 351 to a fourth haptic sensor 354 that are disposed on upper left, lower left, upper right, and lower right of the substrate 340. The number of haptic sensors constituting the haptic module 350 is not limited to this and may change depending on an application.

Meanwhile, in the electronic device having the keyboard region according to the present disclosure, light can be controlled to be emitted as a user input is applied to a power button or the touch pad region. In this regard, FIG. 8 is a view illustrating a lower structure of a touch pad region in an electronic device having a keyboard region according to the present disclosure.

Figure 8:
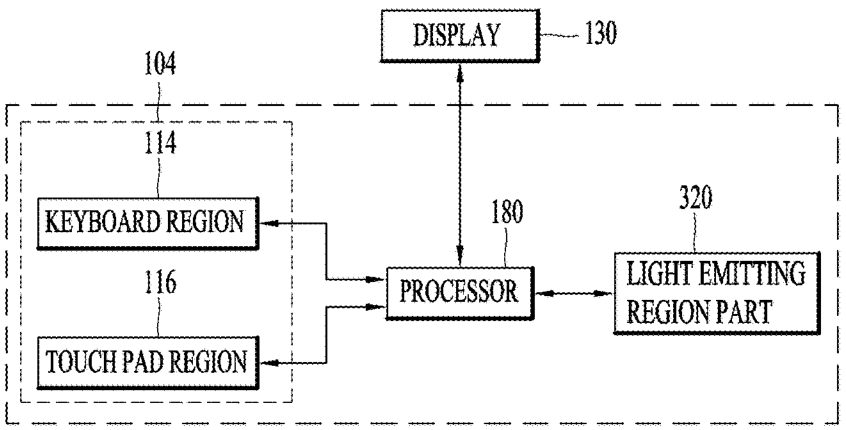
FIG. 8 is a view illustrating a lower structure of a touch pad region in an electronic device having a keyboard region according to the present disclosure.

Referring to FIG. 8, the electronic device 100 may be configured to include a display 130, a base part 104, and a processor 180. The electronic device 100 may be configured to include a keyboard region 114, a touch pad region 116, and a light emitting region part 320 of the base part 104. The processor 180 may be operably coupled to the keyboard region 114, the touch pad region 116, and the light emitting region part 320. Accordingly, the processor 180 may detect a user input on the keyboard region 114 or the touch pad region 116. The processor 180 may control the light emitting region part to emit light according to a user input on the keyboard region 114 or the touch pad region 116 and/or a state of an application program.

Referring to FIGS. 1A to 7, the base part 104 may include the keyboard region 114 and the touch pad region 116. The base part 104 may be configured to include the dielectric mold part 105, a touch pad region 116, and a light emitting region part 320. The base part 104 may further include a transparent layer 311 and an opaque layer 312 formed below the dielectric mold part 105.

The processor 180 may detect that the power button disposed on the base part 104 is pressed or a touch input is applied to the touch pad region 116. The processor 180 may be configured to control the light source 330 by detecting that the power button is pressed or a touch input is applied to the touch pad region 116. When the processor 180 detects that the power button is pressed or a touch input is applied, the processor 180 may control the light source 330 to emit light such that the light is irradiated through the light emitting region part 320.

Figure 9:
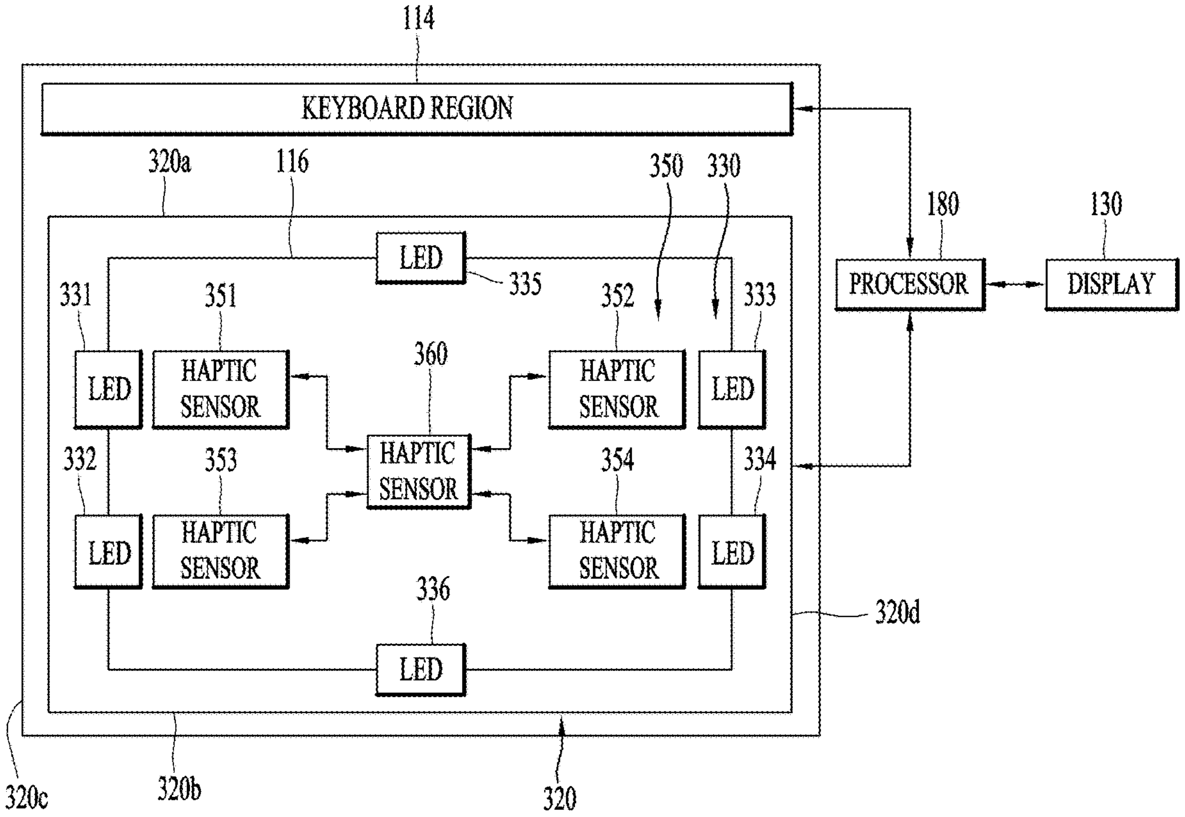
FIG. 9 is a block diagram illustrating an electronic device having a keyboard region and a touch pad region according to the present disclosure.

The processor 180 may control haptic sensors and a haptic motor disposed on the substrate 340 when the touch pad region 116 is pressed. In this regard, FIG. 9 is a block diagram illustrating an electronic device having a keyboard region and a touch pad region according to the present disclosure. Referring to FIG. 9, the electronic device 100 may be configured to include a display 130, a base part 104, and a processor 180. The electronic device 100 may be configured to include a keyboard region 114, a touch pad region 116, and a light emitting region part 320 of the base part 104. The processor 180 may be operably coupled to the keyboard region 114, the touch pad region 116, and the light emitting region part 320.

A plurality of light emitting elements 331 to 336 may be disposed on the touch pad region 116 to be adjacent to the light emitting region part 320. As an example, the first and second light emitting elements 331 and 332 may be disposed on the upper left region and lower left region of the touch pad region 116, as illustrated in FIG. 5. The third and fourth light emitting elements 333 and 334 may be disposed on the upper right region and lower right region of the touch pad region 116. The fifth and sixth light emitting elements 335 and 336 of the touch pad region 116 may be further disposed on a central left region and a central right region. As another example, the first and second light emitting elements 331 and 332 may be disposed on the upper left region and lower left region of the touch pad region 116, as illustrated in FIG. 7. The third and fourth light emitting elements 333 and 334 may be disposed on the upper right region and lower right region of the touch pad region 116. The fifth and sixth light emitting elements 335 and 336 may be disposed above and below the touch pad region 116. In relation to this, alternatively, one light emitting element may be disposed on the left and right regions of the touch pad region 116. Two light emitting elements may also be disposed on the upper and lower regions of the touch pad region 116.

The plurality of light emitting elements 331 to 333 may be disposed above and below one side area of the touch pad region 116. A plurality of light emitting elements 334 to 336 may be disposed on the top, bottom, and center of the another side area of the touch pad region 116. The processor 180 may be configured to control the haptic module 350 and the haptic motor 360 disposed on the touch pad region 116.

A plurality of haptic sensors 351 to 354 may be disposed on different areas of the touch pad region 116. The plurality of haptic sensors 351 and 352 may be disposed above and below one side surface of the touch pad region 116. The plurality of haptic sensors 353 and 354 may be disposed above and below the another side area of the touch pad region 116.

In this regard, the processor 180 may be configured to detect a user input on the keyboard region 114 or the touch pad region 116 and provide luminance control and haptic feedback. The processor 180 may control the light emitting region part to emit light according to a user input on the keyboard region 114 or the touch pad region 116 and/or a state of an application program.

Referring to FIGS. 5 to 9, when the touch pad region 116 is pressed, the processor 180 may detect a touched region and pressure applied to the touched region through any one of the haptic sensors disposed on the substrate 340. The haptic sensors may be configured to include a first haptic sensor 351 to a fourth haptic sensor 354 that are disposed on upper left, lower left, upper right, and lower right of the substrate 340. The number of haptic sensors is not limited thereto and may vary depending on an application.

The processor 180 may control the haptic motor 360 disposed on the substrate 340 to vibrate a touched region. The processor 180 may control the light emitting element 330 corresponding to the touched region to emit light to a specific region corresponding to the touched region. The touched region may be recognized as one of the upper, central, and lower regions of one side and another side of the substrate 340. Accordingly, the processor 180 may control the light emitting region part 320, which is adjacent to the touched region to emit light 20) by determining which region of the upper, central, and lower regions of the one side and the another side of the touch pad region 116 has been touched.

Meanwhile, in the lower structure of the touch pad region according to the present disclosure, a metal case may be formed with different thicknesses and coupled to a dielectric mold part. In this regard, FIG. 10 is a cross-sectional view illustrating an electronic device having a structure in which a dielectric mold part is formed on a touch pad region and inserted into a metal case, according to one embodiment.

Figure 10:
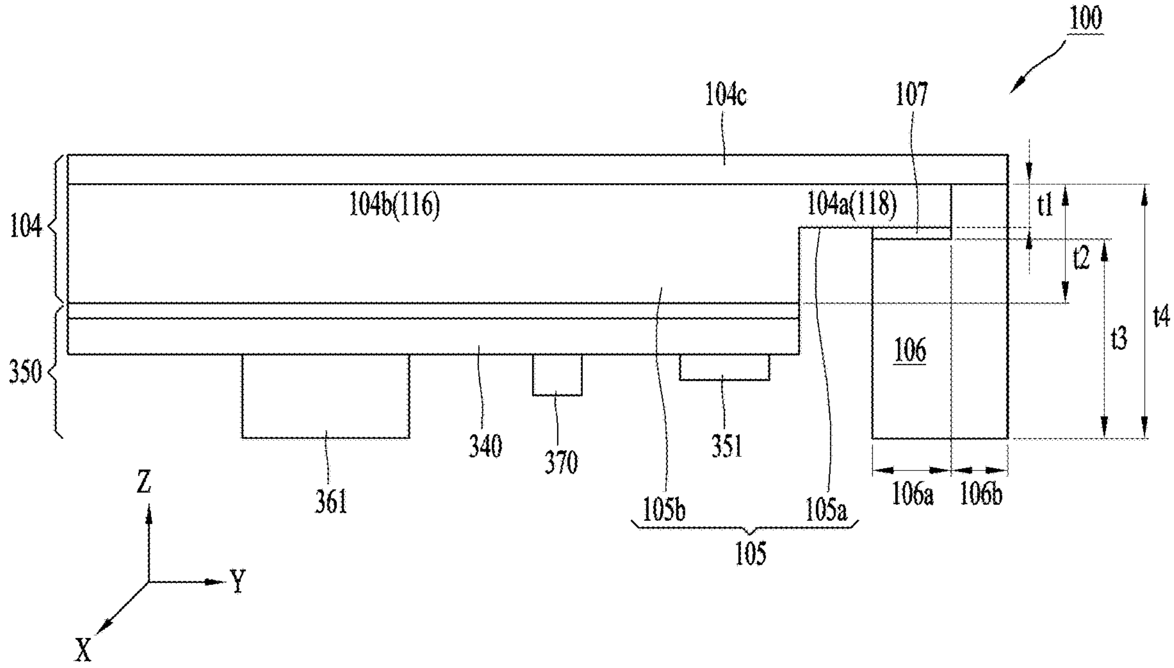
FIG. 10 is a cross-sectional view illustrating an electronic device having a structure in which a dielectric mold part is formed on a touch pad region and inserted into a metal case, according to one embodiment.

Meanwhile, referring to FIG. 10, a dielectric mold part 105 may have a structure that is formed on the touch pad region 116 and inserted into the metal case 106. Accordingly, the metal case 106 may be configured to include a third portion **106*a* and a fourth portion 106*b*. A method of bonding a metal structure and a non-metal structure, which is an alternative to the outsert molding process, is to use adhesives. Among adhesives, a heat sealing tape, which can easily and quickly bond metal and non-metal structures of two materials may be used for adhesion. Meanwhile, a boundary that still exists between the metal and non-metal structures can be hidden by the coating layer 104*c*** through a painting process.

Referring to FIGS. 1A to 5 and 7 to 10, the metal case 106 formed on the first region **104*a* may be configured to include a third portion 106*a* and a fourth portion 106*b*. The third portion 106*a* of the metal case 106 may be coupled to the first portion 105*a* of the dielectric mold part 105**.

The fourth part **106*b* of the metal case 106 may be formed to protrude from the third portion 106*a* on the Z-axis. The third portion 106*a* of the metal case 106 may be formed to have a third thickness t3. The fourth portion 106*b* of the metal case 106 may be formed to have a fourth thickness t4. The fourth thickness t4 of the fourth portion 106*b* of the metal case 106 may be thicker than the third thickness t3 of the third part 106*a*. The third thickness t3 of the third portion 106*a* of the metal case 106 may be thicker than the second thickness t2 of the second portion 105*b* of the dielectric mold part 105. Accordingly, the dielectric mold part 105 may be formed in an inner space of the touch pad region 116 from which the metal case 106 has been removed, and the substrate 340 on which the haptic sensors are disposed may be accommodated in the dielectric mold part 105**.

The fourth portion **106*b* of the metal case 106 may be coupled to the first portion 105*a* of the dielectric mold part 105 through a side end portion. The coating layer 104*c* may be stacked on the top of the fourth portion 106*b* of the metal case 106. The coating layer 104*c* may be formed to extend up to the top of the dielectric mold part 105. The bottom of the third portion 106*a* and the bottom of the fourth portion 106*b* of the dielectric mold part 106 may be disposed at the same position on the Z-axis. The fourth thickness t4 from the bottom to top of the fourth portion 106*b* may be thicker than the third thickness t3 from the bottom to top of the third portion 106*a* of the metal case 106. Accordingly, the top of the third portion 106*a* of the metal case 106 may be formed at a lower position on the Z-axis than the top of the fourth portion 106*b*, so that the third portion 106*a* of the metal case 106** can have a recess structure.

The metal case 106 may have a heat sealing tape 107 that is disposed between the top of the third portion **106*a* and the bottom of the first portion 105*a* of the dielectric mold part 105. The heat sealing tape 107 may be disposed between the top of the third portion 106*a* of the metal case 106 and the bottom of the first portion 105*a* of the dielectric mold part 105, such that the metal case 106 and the dielectric mold part 105** can be fixed to each other through heat sealing.

Meanwhile, the haptic module 350 may be configured to include a substrate 340, haptic sensors 351 to 354, a haptic motor 360, and an integrated circuit 370. The substrate 340 may be disposed on the lower area of the dielectric mold part 105. The haptic sensors 351 to 354 may be disposed on the lower area of the substrate 340 to be adjacent to the metal case. The haptic sensors 351 to 354 may be configured to detect a touched region and pressure applied to the touched region. The haptic sensors 351 to 354 may also be referred to as touch sensors because they sense pressure applied to the touched region and cause the touched region to vibrate.

The haptic motor 360 may be disposed on the lower area of the substrate 340 to vibrate the touched region. The integrated circuit 370 may be disposed between the haptic sensors 351 to 354 and the haptic motor 360. The integrated circuit 370 may be configured to control the operation of the electronic device according to a type of user input applied to the touched region.

The haptic sensors 351 to 354 may include a first haptic sensor 351 to a fourth haptic sensor 354 that are disposed on a top of one side, a bottom of one side, a top of another side, and a bottom of another side of the substrate 340 on an XY plane of the substrate 340. The integrated circuit 370 may detect a user input on the top and bottom of the one side and the top and bottom of the another side of the touch pad region 116 on the XY plane by using the first haptic sensor 351 to the fourth haptic sensor 354.

Figure 11:
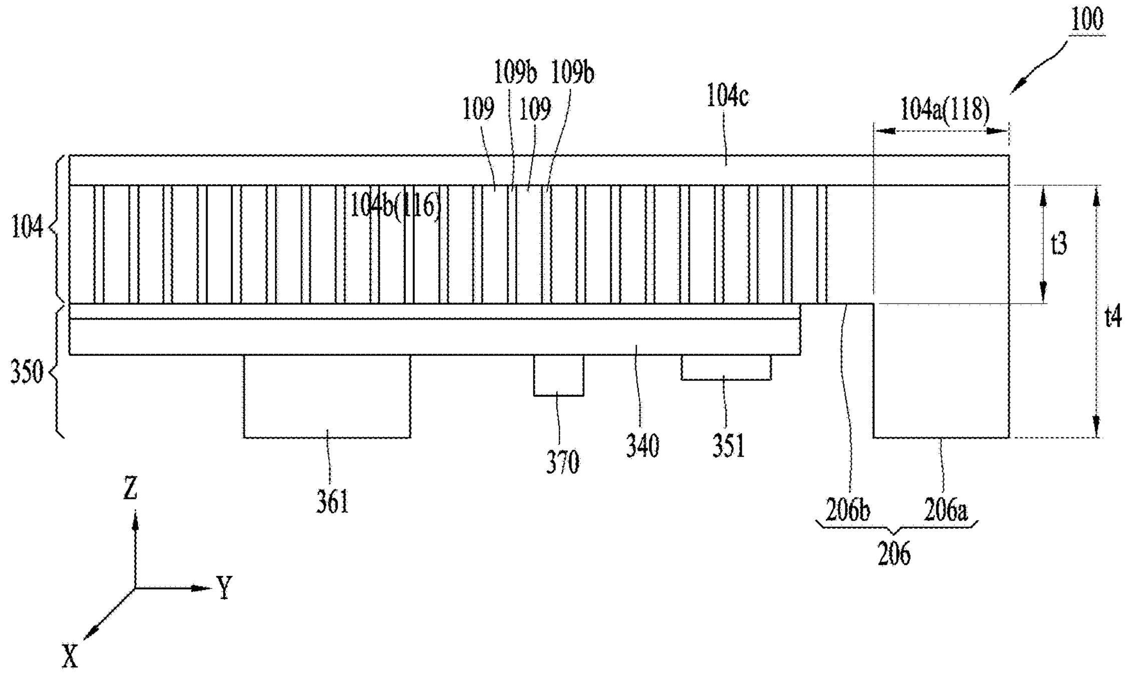
FIG. 11 is a cross-sectional view illustrating an electronic device in which pore structures are formed in a metal case of a touch pad region according to another embodiment.
Figure 12:
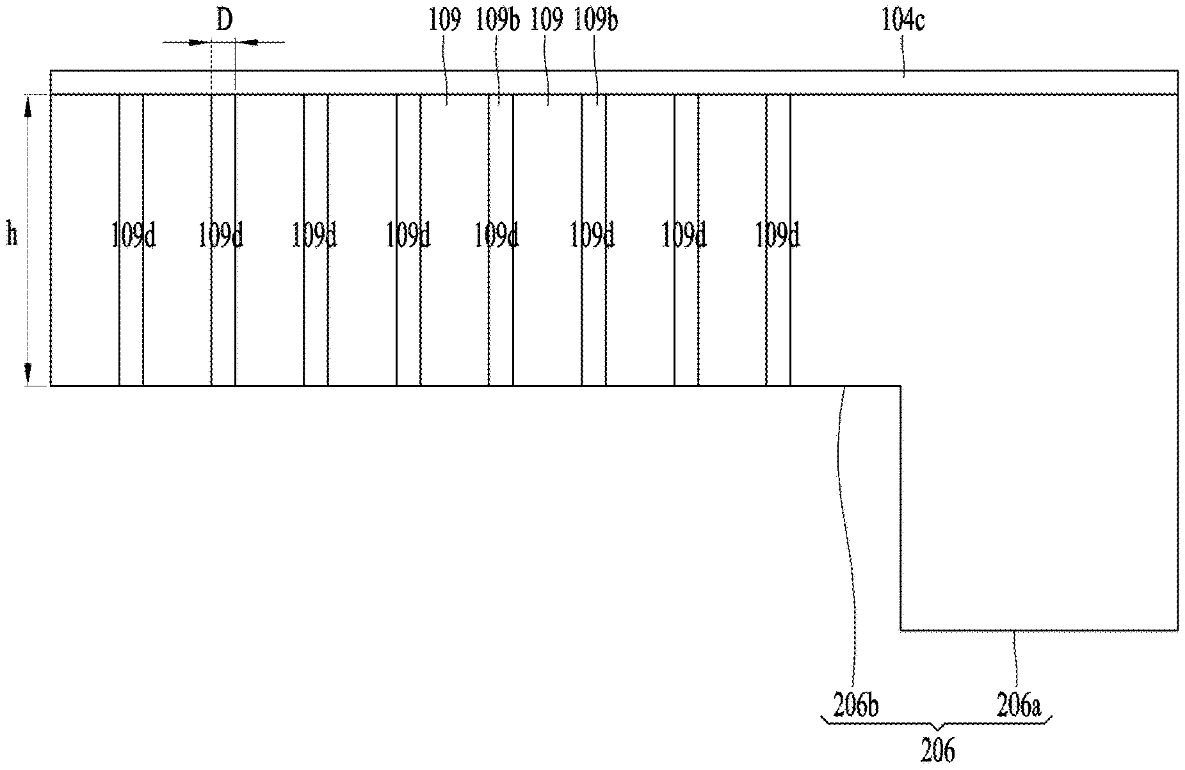
FIG. 12 is an enlarged view illustrating a structure in which dielectric structures are filled in the pore structures of FIG. 11.

Meanwhile, in the electronic device having the base part and the keyboard region according to the present disclosure, pore structures may be formed in the metal case inside the touch pad region, so that the user's touch input can be recognized. In this regard, FIG. 11 is a cross-sectional view illustrating an electronic device in which pore structures are formed in a metal case of a touch pad region according to another embodiment. FIG. 12 is an enlarged view illustrating a structure in which dielectric structures are filled in the pore structures of FIG. 11.

Hereinafter, the electronic device having the base part and the keyboard region manufactured by a chemical etching method will be described, with reference to FIGS. 1A to 5, 7 to 9, 11, and 12.

In this regard, if the top case, namely, the keyboard deck, is manufactured completely using a metal structure, a capacitive touch may not be implemented. However, when fine pore structures are implemented inside the metal structure, a touch operation may be enabled through a region between the pore structures. The pore structures are also exposed to the outside and thereby have a plurality of boundaries. Therefore, the plurality of boundaries formed by the pore structures can implement a seamless design by using a painting process.

In this regard, the electronic device 1000 may be configured to include a display 130 and a base part 104. The electronic device 100 may be configured to further include a haptic module 350.

The display 130 may be configured to display screen information. The base part 104 may be operably coupled to the display 130. The base part 104 may be configured to have the keyboard region 114 and may be configured to detect a touch input. The base part 104 configured to detect a touch input may include the touch pad region 116 and a peripheral region 118. The peripheral region 118 may be formed to surround the touch pad region 116 and the keyboard region 114.

The base part 104 may be configured to include the plurality of regions and the coating layer 104*c*. The base part 104 may be configured to include the first region 104*a*, the second region 140*b*, and the coating layer 104*c*.

The first region 104*a* may be formed as a metal case made of a metal formed on the peripheral region 118. The second region 104*b* may be formed by removing at least a portion of the metal case to correspond to the touch pad region 116. The dielectric mold part 105 may be disposed on the second region 104*b* where at least the portion of the metal case has been removed.

The coating layer 104*c* may be disposed on the upper area of the first region 104*a* and the upper area of the second region 104*b*. The coating layer 104*c* may be disposed on the upper area on a Z-axis with respect to the first region 104*a* and the second region 104*b*. The coating layer 104*c* may be formed on the upper area of the first region 104*a* and the upper area of the second region 104*b* to hide the boundary between the metal case and the dielectric mold part 105. The coating layer 104*c* may be formed on both the touch pad region 116 and the peripheral region 118.

The second region 104*b* of the base part 104 may include a plurality of metal portions 109 formed of a metal material and separated from each other, and pore structures 109*b* formed between the metal portions 109. The pore structures 109*b* may be formed by removing the second region 104*b* of the base part 104 through chemical etching.

Dielectric structures 109*d* may be disposed inside the pore structures 109*b*. The dielectric structures 109*d* may be formed of a non-metal material with a certain dielectric constant. The dielectric structures 109*d* may be filled in the pore structures 109*b* by a putty process. Accordingly, the second region 104*b* of the base part 104 may further include dielectric structures 109*d* that are formed of a non-metal material with a certain dielectric constant and disposed inside the pore structures 109*b*.

A diameter D of the dielectric structures 109*d* may be the same as a diameter of the pore structures 109*b* or may be greater than the diameter of the pore structures 109*b* at a certain ratio or more in consideration of tolerances. The diameter D of the dielectric structures 109*d* may be between 0.95 and 1.0 times the diameter of the pore structures 109*b*.

A height h of the dielectric structures 109*d* may be the same as a height of the pore structures 109*b* or may be greater than the height of the pore structures 109*b* within a certain ratio in consideration of tolerances. The height h of the dielectric structures 109*d* may be between 0.95 and 1.05 times the height of the pore structures 109*b*. A top position of each dielectric structure 109*d* may be the same as a top position of each pore structure 109*b* or may be formed higher than the top position of the pore structure 109*b* by a certain range. To this end, the height h of the dielectric structures 109*d* may be between 1.0 and 1.05 times the diameter of the pore structures 109*b*.

When the top position of the dielectric structure 109*d* is formed higher than the top position of the pore structure 109*b*, the top of the dielectric structure 109*d* and the top of the pore structure 109*b* may be tuned to be located on the same top position through a grinding process. This can compensate for a rough cross-sectional structure due to the chemical etching.

Accordingly, the coating layer 104*c* disposed on the top of the pore structures 109*b* and the top of the dielectric structures 109*d* can be formed uniformly. Additionally, since the pore structures 109*b* are filled with the dielectric structures 109*d*, deformation of the pore structures 109*b* due to the use of the electronic device, such as a touch operation, can be suppressed. Additionally, as the dielectric structures 109*d* having the dielectric constant of a certain value or higher are filled in the pore structures 109*b*, the accuracy of capacitive touch recognition can be improved.

Meanwhile, the haptic module 350 may be disposed below the pore structures 109*b* filled with the dielectric structures 109*d*. The haptic module 350 may detect a touch input applied to a touched region of the touch pad region 116 and control the touched region to vibrate.

The pore structures 109*b* may be formed in a cylindrical shape with a certain diameter or less in the second region 104*b* of the base part 104. The pore structures 109*b* may be formed up to the bottom of the metal case 206 in the second region 104*b* of the base part 104, so that a touch input on the touch pad region 116 is transmitted to the haptic module 350. Accordingly, the pore structures 109*b* may be formed as through via structures to penetrate through the second region 104*b* of the metal case 206.

The metal case 206 formed on the first region 104*a* may be configured to include a third portion 206*a* and a fourth portion 206*b*. The third portion 106*a* of the metal case 206 may be coupled to the first region 104*a* of the base part 104. The fourth portion 206*b* of the metal case 206 may be coupled to the second region 104*b* of the base part 104.

The top of the third portion 206*a* and the top of the fourth portion 206*b* of the metal case 206 may be disposed at the same position on the Z-axis. The third portion 206*a* of the metal case 206 may be formed to have a third thickness t3. The fourth portion 206*b* of the metal case 206 may be formed to have a fourth thickness t4. The fourth thickness t4 of the fourth portion 206*b* of the metal case 206 may be thicker than the third thickness t3 of the third part 206*a*. The bottom of the fourth portion 106*b* of the metal case 206 may be disposed to be lower than the bottom of the third portion 206*a* on the Z-axis. Accordingly, the dielectric mold part 105 may be formed in an inner space of the touch pad region 116 from which the metal case 206 has been removed, and the substrate 340 on which the haptic sensors are disposed may be accommodated in the dielectric mold part 105.

Meanwhile, the height h of the dielectric structures 109*d* may be the same as a third thickness t3 of the third portion 206 of the metal case 206 or may be formed within a certain range in consideration of tolerances. The height h of the dielectric structures 109*d* may be formed between 0.95 and 1.05 times the third thickness t3 of the third portion 206 of the metal case 206. The top position of each dielectric structure 109*d* may be the same as the top position of each pore structure 109*b* or may be formed higher than that by a certain range.

When the top position of the dielectric structures 109*d* is formed higher than the top position of the pore structures 109*b*, the top of the dielectric structures 109*d* and the top of the pore structures 109*b* may be tuned to be located on the same top position through a grinding process. This can compensate for a rough cross-sectional structure due to the chemical etching.

Meanwhile, the haptic module 350 may be configured to include a substrate 340, haptic sensors 351 to 354, a haptic motor 360, and an integrated circuit 370. The substrate 340 may be disposed on the lower area of the dielectric mold part 105. The haptic sensors 351 to 354 may be disposed on the lower area of the substrate 340 to be adjacent to the metal case. The haptic sensors 351 to 354 may be configured to detect a touched region and pressure applied to the touched region. The haptic sensors 351 to 354 may also be referred to as touch sensors because they sense pressure applied to the touched region and cause the touched region to vibrate.

The haptic motor 360 may be disposed on the lower area of the substrate 340 to vibrate the touched region. The integrated circuit 370 may be disposed between the haptic sensors 351 to 354 and the haptic motor 360. The integrated circuit 370 may be configured to control the operation of the electronic device according to a type of user input applied to the touched region.

The haptic sensors 351 to 354 may include a first haptic sensor 351 to a fourth haptic sensor 354 that are disposed on a top of one side, a bottom of one side, a top of another side, and a bottom of another side of the substrate 340 on an XY plane of the substrate 340. The integrated circuit 370 may detect a user input on the top and bottom of the one side and the top and bottom of the another side of the touch pad region 116 on the XY plane by using the first haptic sensor 351 to the fourth haptic sensor 354.

The foregoing description has been given of an electronic device having a keyboard according to one aspect of the present disclosure. Hereinafter, a method for manufacturing a bottom case of an electronic device having a keyboard will be described. In this regard, all descriptions of the electronic device having the keyboard described above will be applied to the method for manufacturing the bottom case of the electronic device having the keyboard below.

Figure 13:
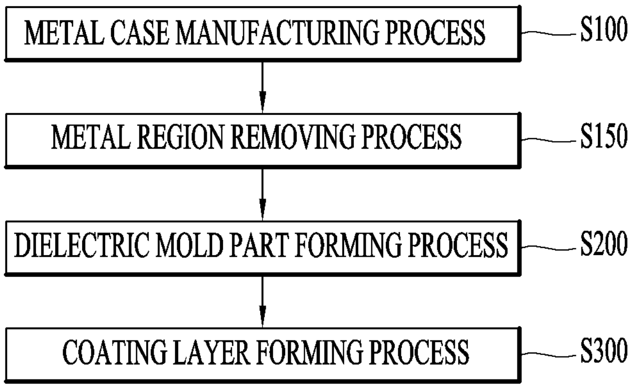
FIG. 13 is a flowchart illustrating a method for manufacturing a bottom case of an electronic device having a keyboard.

Meanwhile, FIG. 13 is a flowchart illustrating a method for manufacturing a bottom case of an electronic device having a keyboard according to the present disclosure. Referring to FIG. 13, a method for manufacturing a bottom case may be configured to include a metal case manufacturing process (S100), a metal region removing process (S150), a dielectric mold part forming process (S200), and a coating layer forming process (S300). The method for manufacturing the bottom case may be performed by a manufacturing device that manufactures the bottom case of the electronic device.

In the metal case manufacturing process (S100), a base part that is operably coupled to a display, has a keyboard area, and is configured to detect a touch input may be formed of a metal material. The base part may include a touch pad region that detects a touch input and a peripheral region that surrounds the touch pad region and the keyboard region. The metal case 106 of FIG. 6 manufactured in the metal case manufacturing process (S100) may be formed to have the same thickness along the Z-axis direction. The metal case 106 of FIG. 10 manufactured in the metal case manufacturing process (S100) may include the third portion 206*a* and the fourth portion 206*b* and may thus be formed to have different thicknesses.

In the metal region removing process (S150), at least a portion of the metal case may be removed to correspond to the touch pad region. A first region of the base part may be formed as a metal case made of a metal formed on the peripheral region, and a second region may be formed by removing at least a portion of the metal case to correspond to the touch pad region.

In the dielectric mold part forming process (S200), a dielectric mold part may be formed on the second region of the base part.

In the coating layer forming process (S300), a coating layer may be formed on an upper area of the first region and an upper area of the second region to hide a boundary line between the metal case and the dielectric mold part.

Figure 14:
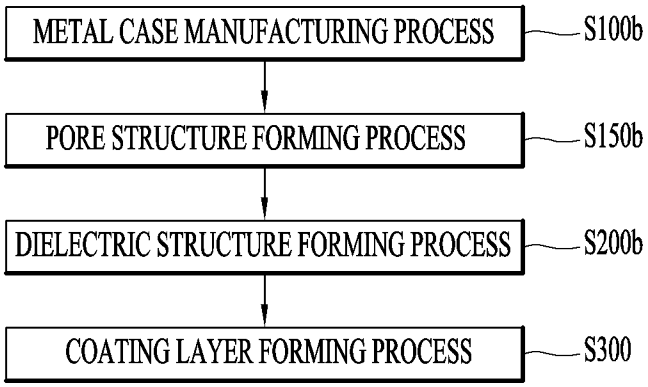
FIG. 14 is a flowchart illustrating a method for manufacturing a bottom case of an electronic device including a keyboard according to another embodiment of the present disclosure.

Meanwhile, the bottom case of the electronic device including the keyboard according to the present specification may be formed with pore structures of the metal case without a dielectric mold part. In this regard, FIG. 14 is a flowchart illustrating a method for manufacturing a bottom case of an electronic device including a keyboard according to another embodiment of the present disclosure. Referring to FIG. 14, a method for manufacturing a bottom case may be configured to include a metal case manufacturing process (S100*b*), a pore structure forming process (S150*b*), a dielectric structure forming process (S200*b*), and a coating layer forming process (S300). The method for manufacturing the bottom case may be performed by a manufacturing device that manufactures the bottom case of the electronic device.

In the metal case manufacturing process (S100*b*), a base part that is operably coupled to a display, has a keyboard area, and is configured to detect a touch input may be formed of a metal material. The base part may include a touch pad region that detects a touch input and a peripheral region that surrounds the touch pad region and the keyboard region. The metal case 206 of FIG. 11 manufactured in the metal case manufacturing process (S100*b*) may include the third portion 206*a* and the fourth portion 206*b* and may thus be formed to have different thicknesses. The metal case 206 of FIG. 11 manufactured in the metal case manufacturing process (S100*b*) may be formed on both the first region 104*a* and the second region 104*b* of the base part 104.

In the pore structure formation process (S150*b*), metal materials may be removed through chemical etching from the second region of the base part to form pore structures. The pore structures 109*b* of FIG. 11 may be formed in a cylindrical shape with a certain diameter or less in the second region 104*b* of the base part 104.

In the dielectric structure forming process (S200*b*), dielectric structures may be formed of a non-metal material in the second region of the base part and disposed inside the pore structures. A diameter D of the dielectric structures 109*d* of FIG. 11 may be the same as a diameter of the pore structures 109*b* or may be greater than that at a certain ratio smaller than one (1). A height of the dielectric structures 109*d* may be the same as or higher than by a certain range than a height of the pore structures 109*b*. The dielectric structures 109*d* may be filled in the pore structures 109*b* by a putty process. A top position of each dielectric structure 109*d* may be higher than a top position of each pore structure 109*b*. The top of the dielectric structures 109*d* and the top of the pore structures 109*b* may be tuned to be located at the same top position by a grinding process.

In the coating layer forming process (S300), a coating layer may be formed on an upper area of the first region and an upper area of the second region to hide a boundary between the first region of the metal case and the second region of the touch pad region.

So far, an electronic device having a touch pad region and a keyboard and a method for manufacturing the same according to the present disclosure have been described. Hereinafter, technical effects of an electronic device having a touch pad region and a keyboard according to the present disclosure will be described.

According to the present disclosure, there may be provided an electronic device that adopts outsert molding to a touch pad region and has a keyboard region formed integrally so that a boundary does not exist between the touch pad region and a peripheral region.

According to the present disclosure, a completely seamless design can be achieved through a painting process such that there are no boundaries between the touch pad region and the peripheral region and between upper and lower areas. Accordingly, the touch pad region and the peripheral region may be formed integrally with each other so that the touch pad region and the peripheral region are not distinguishable with the naked eye.

According to the present disclosure, light emitting elements may be additionally disposed on a substrate disposed inside the touch pad region, to feedback whether a user input has been normally applied through light emission to a specific region, thereby forming a feedback region adjacent to a region where the user input has been applied.

According to the present disclosure, there may be provided a structural design and algorithm that can feedback whether a user input has been normally applied through light emission to a specific region disposed on top of the touch pad region.

According to the present disclosure, a haptic active area where haptic feedback related to a touch input is provided can be provided to the user through an intuitive user interface.

Further scope of applicability of the present disclosure will become apparent from the foregoing detailed description. It should be understood, however, that the detailed description and specific examples, such as the preferred embodiment of the invention, are given by way of illustration only, since various changes and modifications within the idea and scope of the invention will be apparent to those skilled in the art. Therefore, the detailed description should not be limitedly construed in all of the aspects, and should be understood to be illustrative. The scope of the invention should be determined by reasonable interpretation of the appended claims and all changes that come within the equivalent scope of the invention are included in the scope of the disclosure.

The invention claimed is:

1. An electronic device comprising:

a display configured to display an image; and a base part operably coupled to the display, the base part having a touch pad region for detecting a touch input, a keyboard region including a keyboard, and a peripheral region surrounding the touch pad region and the keyboard region, wherein the base part comprises:

a first region of a metal case and including the peripheral region;

a second region of the metal case and corresponding to the touch pad region; and a coating layer disposed on an upper area of the first region and an upper area of the second region to cover a boundary between the first region and the second region, and wherein the coating layer is on both the touch pad region and the peripheral region, wherein the touch pad region corresponding to the second region is formed as a dielectric mold part formed of a non-metal material at a same position as a top of the metal case, and the coating layer is disposed on an upper area of the dielectric mold part, wherein the dielectric mold part comprises a first portion coupled to the metal case and a second portion stacked on a substrate of a haptic module, tops of the first portion and the second portion are coplanar, and a second thickness of the second portion is thicker than a first thickness of the first portion.

2. The electronic device of claim 1, wherein the coating layer is further disposed on an upper area of the metal case to cover a boundary between the metal case and the dielectric mold part.

3. The electronic device of claim 2, wherein the haptic module is disposed on a lower area of the dielectric mold part, and wherein the haptic module is configured to detect the touch input applied to a touched region of the touch pad region, and is configured to control the touched region to vibrate.

4. The electronic device of claim 1, wherein the metal case is coupled to the first portion of the dielectric mold part, wherein one end portion of the metal case extends up to another end portion of the first portion of the dielectric mold part, and wherein the top of the metal case is coupled to the coating layer, and a fourth thickness of the metal case is thicker than the first thickness of the first portion and the second thickness of the second portion of the dielectric mold part.

5. The electronic device of claim 1, wherein the metal case comprises:

a third portion coupled to the first portion of the dielectric mold part; and a fourth portion coupled to the first portion of the dielectric mold part through a side end portion and having the coating layer stacked on a top thereof, wherein a bottom of the third portion and a bottom of the fourth portion are coplanar, and wherein a fourth thickness of the metal case from the bottom to the top of the fourth portion is thicker than a third thickness from the bottom to a top of the third portion, so that the top of the third portion has a recess structure.

6. The electronic device of claim 5, wherein the metal case further comprises a heat sealing tape disposed between the top of the third portion of the metal case and the bottom of the first portion of the dielectric mold part to fix the metal case and the dielectric mold part by heat sealing.

7. The electronic device of claim 3, wherein the haptic module comprises:

the substrate disposed on the lower area of the dielectric mold part;

haptic sensors disposed on a lower area of the substrate to be adjacent to the metal case to detect the touch input and pressure applied to the touched region;

a haptic motor disposed on the lower area of the substrate to vibrate the touched region; and an integrated circuit disposed between the haptic sensors and the haptic motor to control an operation of the electronic device according to a type of user input on the touched region.

8. The electronic device of claim 7, wherein the haptic sensors comprise a first haptic sensor to a fourth haptic sensor disposed on a top of one side, a bottom of the one side, a top of another side, and a bottom of the another side of the substrate on an XY plane, and wherein the integrated circuit detects user inputs on a top of one side, a bottom of the one side, a top of another side, and a bottom of the another side of the touch pad region on the XY plane, by using the first haptic sensor to the fourth haptic sensor.

9. The electronic device of claim 3, wherein the second region comprises a plurality of metal portions including a metal material and separated from each other, and pore structures formed between the plurality of metal portions, and wherein the pore structures are formed by removing metal materials from the second region through chemical etching.

10. The electronic device of claim 9, wherein the pore structures are formed in a cylindrical shape having a diameter in the second region, and wherein the pore structures are formed up to a bottom of the metal case in the second region, so that the touch input on the touch pad region is transmitted to the haptic module.

11. The electronic device of claim 10, wherein the metal case comprises a third portion formed on the second region and a fourth portion formed on the first region, wherein a top of the third portion and a top of the fourth portion are coplanar, and wherein a fourth thickness of the fourth portion is thicker than a third thickness of the third portion.

12. The electronic device of claim 11, wherein the second region further comprises dielectric structures including a non-metal material having a certain dielectric constant and disposed inside the pore structures, wherein a diameter of the dielectric structures is a same as the diameter of the pore structures, and wherein a height of the dielectric structures is a same as or higher than a height of the pore structures by a certain range.

13. The electronic device of claim 12, wherein the dielectric structures are filled in the pore structures by a putty process, wherein a top position of each of the dielectric structures is higher than a top position of each of the pore structures, and wherein a top of a dielectric structure of the dielectric structures and a top of a pore structure of the pore structures are tuned to be located at a same top position by a grinding process.

14. The electronic device of claim 10, further comprising another haptic module disposed on a lower area of the second region including the pore structures, detects the touch input applied to the touched region of the touch pad region, and controls the touched region to vibrate.

15. The electronic device of claim 14, wherein the another haptic module further comprises:

a substrate disposed on a lower area of the metal case of the second region where the pore structures are formed;

haptic sensors disposed on a lower area of the substrate to be adjacent to the metal case of the first region to detect the touch input and pressure applied to the touched region;

a haptic motor disposed on the lower area of the substrate to vibrate the touched region; and an integrated circuit disposed between the haptic sensors and the haptic motor to control an operation of the electronic device according to a type of user input on the touched region.

16. The electronic device of claim 15, wherein the haptic sensors comprise a first haptic sensor to a fourth haptic sensor disposed on a top of one side, a bottom of the one side, a top of another side, and a bottom of the another side of the substrate on an XY plane, and wherein the integrated circuit detects user inputs on a top of one side, a bottom of the one side, a top of another side, and a bottom of the another side of the touch pad region on the XY plane, by using the first haptic sensor to the fourth haptic sensor.

17. An electronic device comprising:

a display configured to display an image;

a base part connected to the display and formed of a metal case, the base part having a touch pad region configured to detect a touch input, a keyboard region including a keyboard, and a peripheral region adjacent the touch pad region and the keyboard region; and a coating layer that extends from the touch pad region to the keyboard region, and covering a boundary between the touch pad region and the keyboard region, wherein the touch pad region includes a dielectric mold part formed of a non-metal material at a same position as a top of the metal case, and the coating layer is disposed on an upper area of the dielectric mold part, and wherein the dielectric mold part comprises a first portion coupled to the metal case and a second portion stacked on a substrate of a haptic module, tops of the first portion and the second portion are coplanar, and a second thickness of the second portion is thicker than a first thickness of the first portion.

18. The electronic device of claim 17, wherein the base part includes a surface and an opening in the surface, and wherein the keyboard region and the peripheral region are located on the surface, and the touch pad region is located in the opening.

* * * * *